United States Patent
Seo et al.

(10) Patent No.: US 9,661,627 B2
(45) Date of Patent: May 23, 2017

(54) METHOD FOR SETTING SEARCH REGION FOR DOWNLINK CONTROL CHANNEL IN WIRELESS COMMUNICATION SYSTEM, AND APPARATUS THEREFOR

(71) Applicant: LG ELECTRONICS INC., Seoul (KR)

(72) Inventors: Hanbyul Seo, Anyang-si (KR); Suckchel Yang, Anyang-si (KR); Seungmin Lee, Anyang-si (KR); Jihyun Lee, Anyang-si (KR); Hakseong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/203,561

(22) Filed: Jul. 6, 2016

(65) Prior Publication Data

US 2016/0316461 A1  Oct. 27, 2016

Related U.S. Application Data

(63) Continuation of application No. 14/390,711, filed as application No. PCT/KR2013/002400 on Mar. 22, 2013, now Pat. No. 9,414,374.

(Continued)

(30) Foreign Application Priority Data

Mar. 21, 2013 (KR) .................. 10-2013-0030264

(51) Int. Cl.
*H04W 72/04* (2009.01)
*H04L 5/00* (2006.01)

(52) U.S. Cl.
CPC ........... *H04W 72/042* (2013.01); *H04L 5/001* (2013.01); *H04L 5/0039* (2013.01); *H04L 5/0048* (2013.01); *H04L 5/0053* (2013.01)

(58) Field of Classification Search
None
See application file for complete search history.

(56) References Cited

U.S. PATENT DOCUMENTS

2013/0044664 A1  2/2013  Nory et al.
2013/0107822 A1*  5/2013  Papasakellariou .... H04L 1/0045
                                                         370/329

(Continued)

FOREIGN PATENT DOCUMENTS

JP       2015-508956 A    3/2015
WO    WO 2011/037439 A2  3/2011

(Continued)

OTHER PUBLICATIONS

CATT, "PDCCH search space design in LTE-A", 3GPP TSG RAN WG1 Meeting #61bis, R1-103466, Dresden, Germany, Jun. 28-Jul. 2, 2010, 6 pages.
Qualcomm Incorporated, "Reference signals for e-PDCCH", 3GPP TSG RAN WG1 #68bis, R1-121570, Jeju, Korea, Mar. 26-30, 2012, 4 pages.
Research in Motion, UK Limited, "Search Space Design for E-PDCCH", 3GPP TSG RAN WG1 Meeting #68bis, R1-121478, Jeju, Korea, Mar. 26-30, 2012, pp. 1-6.
3GPP, "Technical Specification Group Radio Access Network; Evolved Universal Terrestrial Radio.Access (E-UTRA); Physical layer procedures (Release 8)," 3GPP TS 36.213 V8.7.0, May 2009, pp. 1-77.

(Continued)

*Primary Examiner* — Diane Lo
(74) *Attorney, Agent, or Firm* — Birch, Stewart, Kolasch & Birch, LLP

(57) ABSTRACT

A method is provided for receiving an Enhanced Physical Downlink Control Channel (EPDCCH) from a base station by a user equipment (UE) in a wireless communication system. An EPDCCH is received for a first carrier by monitoring first EPDCCH candidates for the first carrier in a specific physical resource block (PRB) pair set. An EPDCCH is received for a second carrier by monitoring second EPDCCH candidates for the second carrier in the specific PRB pair set. The first EPDCCH between each of the first EPDCCH candidates at a specific aggregation level. The second EPDCCH candidates have an offset smaller than the interval from the first EPDCCH candidates.

12 Claims, 19 Drawing Sheets

Related U.S. Application Data

(60) Provisional application No. 61/750,348, filed on Jan. 8, 2013, provisional application No. 61/727,743, filed on Nov. 18, 2012, provisional application No. 61/724,286, filed on Nov. 8, 2012, provisional application No. 61/680,262, filed on Aug. 6, 2012, provisional application No. 61/623,586, filed on Apr. 13, 2012.

(56) References Cited

U.S. PATENT DOCUMENTS

| | | |
|---|---|---|
| 2013/0194931 A1 | 8/2013 | Lee et al. |
| 2013/0215842 A1* | 8/2013 | Han ............... H04W 72/042 370/329 |
| 2013/0223366 A1* | 8/2013 | Papasakellariou .. H04W 72/042 370/329 |
| 2013/0242904 A1* | 9/2013 | Sartori ............ H04L 5/0053 370/329 |
| 2013/0250880 A1* | 9/2013 | Liao ............... H04W 72/042 370/329 |
| 2014/0092821 A1 | 4/2014 | Zhu et al. |
| 2014/0301283 A1* | 10/2014 | Frenne ............ H04L 5/001 370/329 |

FOREIGN PATENT DOCUMENTS

| | | |
|---|---|---|
| WO | WO 2011/159132 A2 | 12/2011 |
| WO | WO 2012/024325 A1 | 2/2012 |
| WO | WO 2013/112972 A1 | 8/2013 |

OTHER PUBLICATIONS

Fujitsu, "UE-specific Search Space Design for Enhanced Downlink Control Channel," 3GPP TSG-RAN WG1 #68bis, R1-121195, Jeju, Korea, Mar. 26-30, 2012 (downloaded by the EPO on Mar. 20, 2012), pp. 1-6, XP-50599492A.

Huawei et al., "UE-specific Search Space for ePDCCH," 3GPP TSG RAN WG1 Meeting #68bis, R1-120998, Mar. 26-30, 2012 (downloaded by the EPO on Mar. 20, 2012), 5 pages, XP-50599309A.

Nokia et al., "Considerations on Search Spaces," 3GPP TSG RAN WG1 #68bis Meeting, R1-121287, Jeju, Korea, Mar. 26-30, 2012 (downloaded by the EPO on Mar. 20, 2012), 7 pages, XP-50599577A.

NTT DOCOMO, "Search Space Design for Localized EPDCCH Transmission," 3GPP TSG RAN WG1 Meeting #70bis, R1-124256, San Diego, USA, Oct. 8-12, 2012, pp. 1-6.

Panasonic, "Consideration on Search Space Design for ePDCCH," 3GPP TSG RAN WG1 Meeting #68bis, R1-121162, Jeju, Korea, Mar. 26-30, 2012, 4 pages.

Research in Motion et al., "DMRS Port Assignment for E-PDCCH," 3GPP TSG RAN WG1 Meeting #68bis, R1-121480, Jeju, South Korea, Mar. 26-30, 2012, (downloaded by EPO on Mar. 20, 2012), pp. 1-7, XP-50600034A.

CATT, "PDCCH Search Space Design in LTE-A," 3GPP TSG RAN WG1 Meeting #61bis, R1-103466, Dresden, Germany, Jun. 28-Jul. 2, 2010, 5 pages.

Qualcomm Incorporated, "Reference Signals for e-PDCCH," 3GPP TSG RAN WG1 #68, R1-120559, Dresden, Germany, Feb. 6-10, 2012, pp. 1-2.

* cited by examiner

FIG. 2
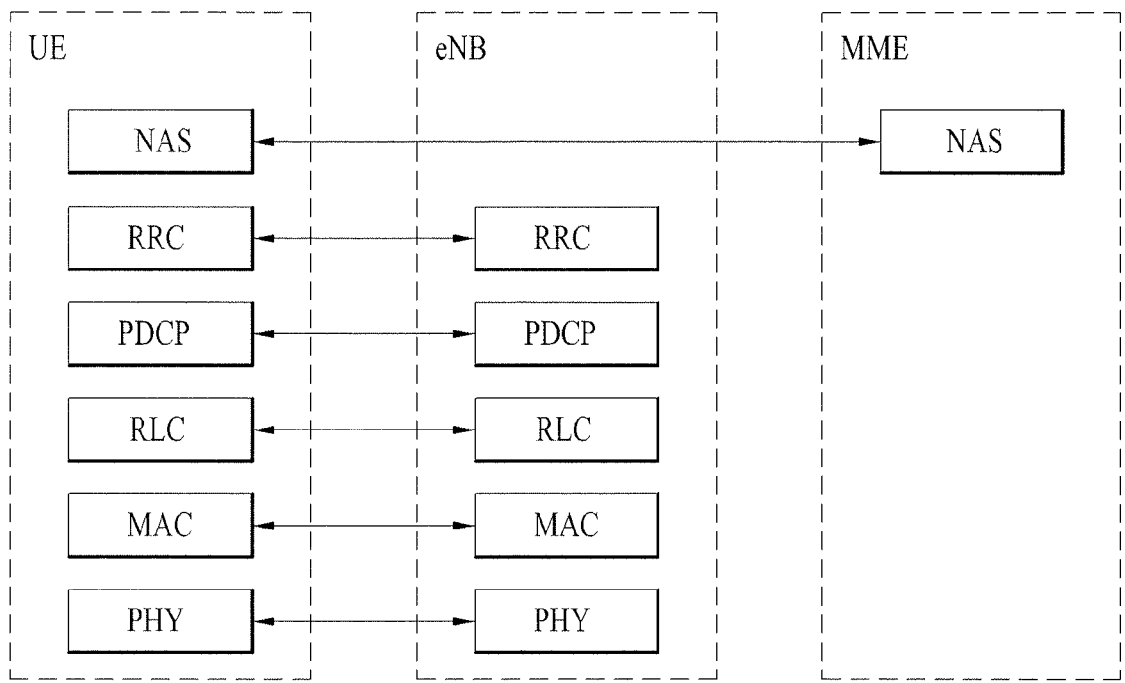
(a) Control-plane protocol stack
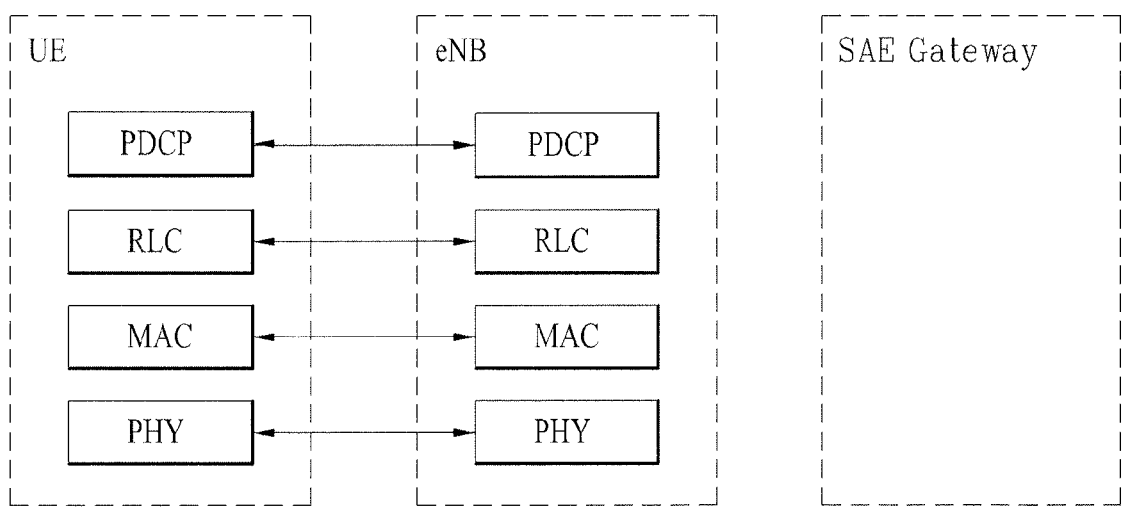
(b) User-plane protocol stack

FIG. 5
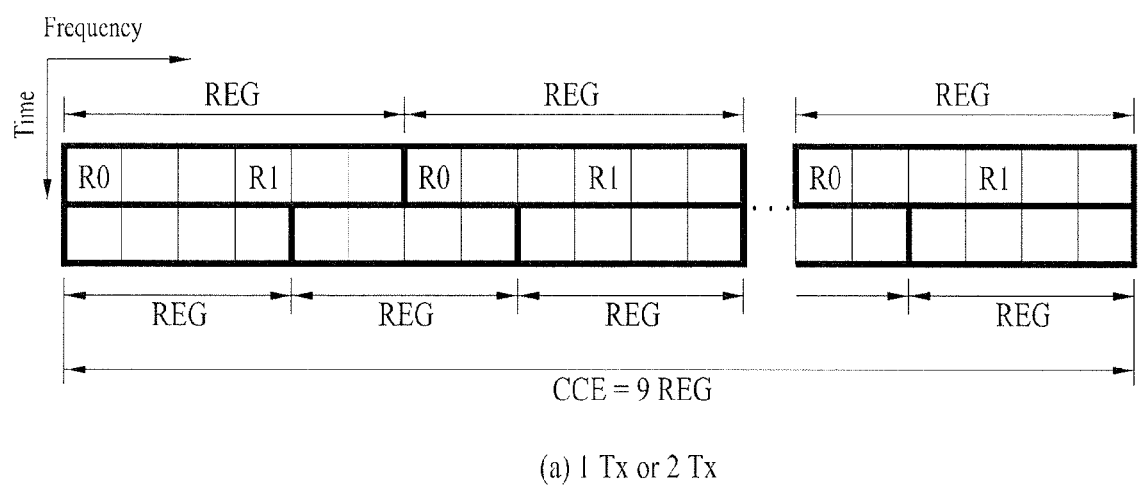
(a) 1 Tx or 2 Tx
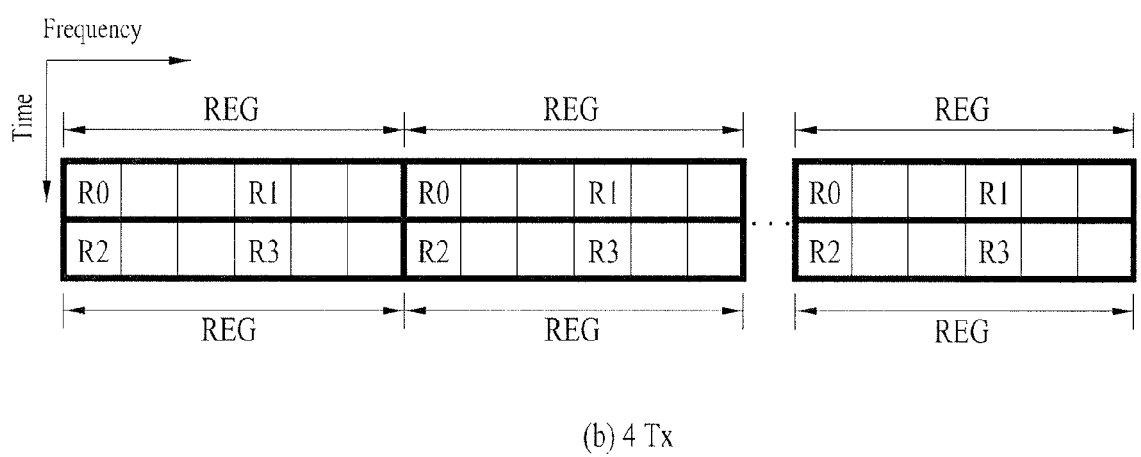
(b) 4 Tx

FIG. 15
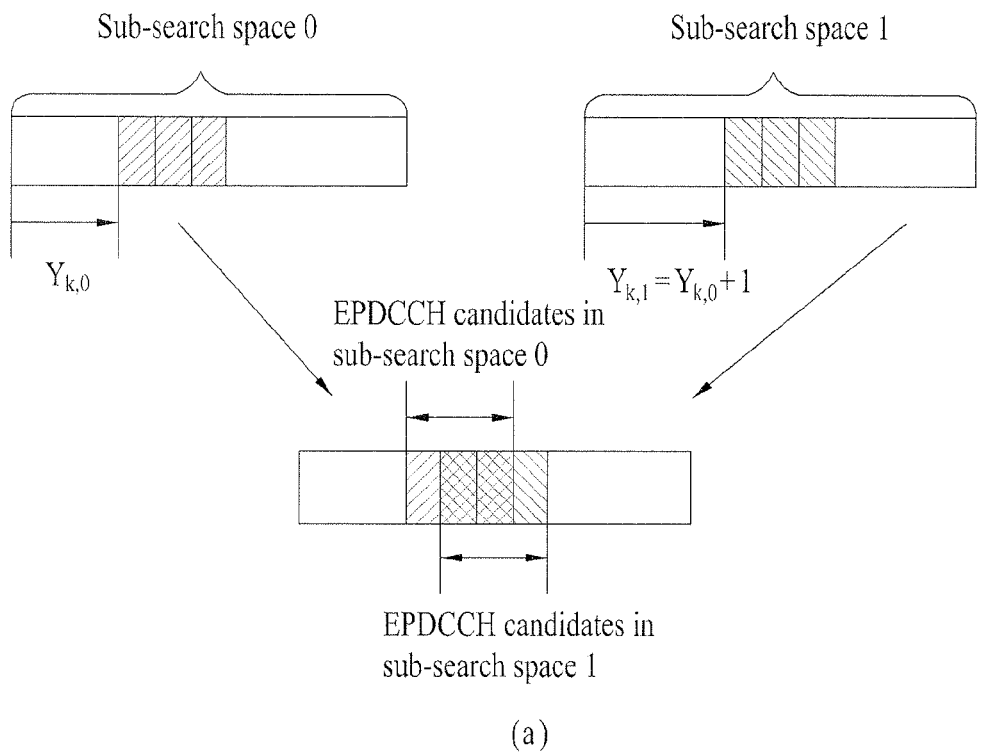
(a)
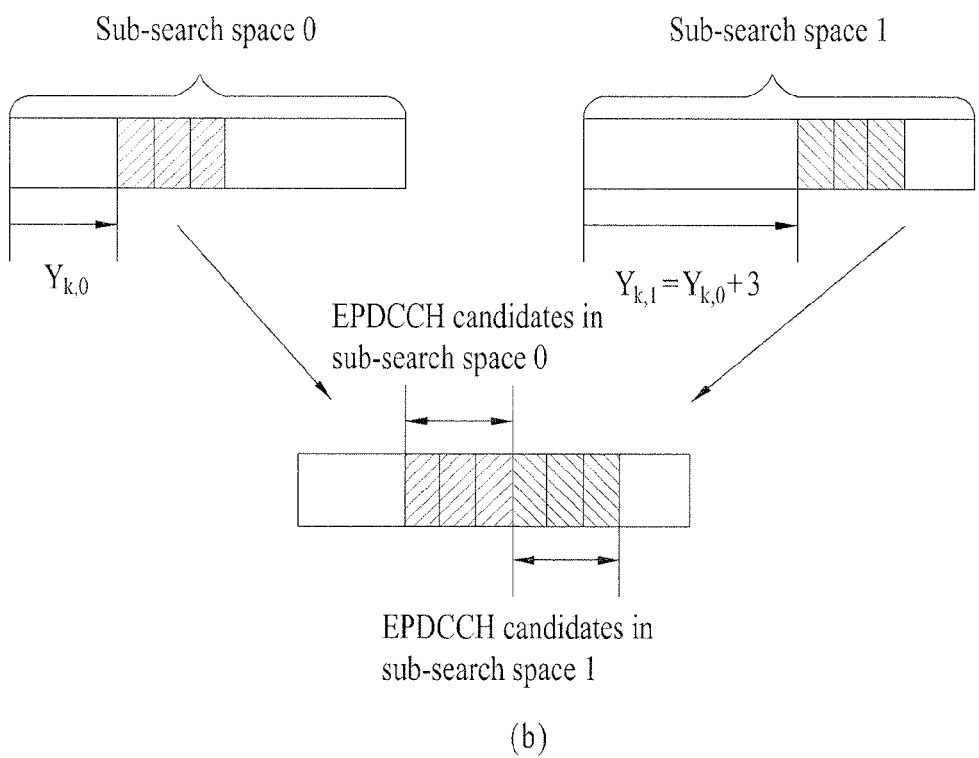
(b)

METHOD FOR SETTING SEARCH REGION FOR DOWNLINK CONTROL CHANNEL IN WIRELESS COMMUNICATION SYSTEM, AND APPARATUS THEREFOR

CROSS REFERENCE TO RELATED APPLICATIONS

This application is a Continuation of copending U.S. application Ser. No. 14/390,711 filed on Oct. 3, 2014, which is the National Phase of PCT/KR2013/002400 filed on Mar. 22, 2013, which claims priority under 35 U.S.C. 119(e) to U.S. Provisional Application No. 61/750,348 filed on Jan. 8, 2013, to U.S. Provisional Application No. 61/727,743 filed on Nov. 18, 2012, to U.S. Provisional Application No. 61/724,286 filed on Nov. 8, 2012, to U.S. Provisional Application No. 61/680,262 filed on Aug. 6, 2012, to U.S. Provisional Application No. 61/623,586 filed on Apr. 13, 2012, and under 35 U.S.C. 119(a) to Patent Application No. 10-2013-0030264 filed in the Republic of Korea on Mar. 21, 2013, all of which are incorporated by reference herein in its entirety.

BACKGROUND OF THE INVENTION

The present invention relates to a wireless communication system and, more specifically, to a method for setting a search space for a downlink control channel in a wireless communication system and an apparatus therefor.

A brief description will be given of a $3^{rd}$ Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously for broadcast service, multicast service, and/or unicast service.

A single eNB manages one or more cells. A cell is set to operate in one of the bandwidths of 1.44, 3, 5, 10, 15 and 20 MHz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency region in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency region in which the UE can transmit data, a coding scheme, a data size, HARQ information, etc. by transmitting UL scheduling information to the UE. An interface for transmitting user traffic or control traffic may be used between eNBs. A Core Network (CN) may include an AG and a network node for user registration of UEs. The AG manages UE mobility on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, new technological evolution is required to achieve future competitiveness. Specifically, cost reduction per bit, increased service availability, flexible use of frequency bands, simplified structure, an open interface, appropriate power consumption of UEs, etc. are required.

SUMMARY OF THE INVENTION

An object of the present invention devised to solve the problem lies in a method for setting a search space for a downlink control channel in a wireless communication system and an apparatus therefor.

In an aspect of the present invention, a method for receiving an EPDCCH (Enhanced Physical Downlink Control Channel) from a base station by a user equipment (UE) in a wireless communication system includes: receiving the EPDCCH by monitoring EPDCCH candidates in at least one resource block set for the EPDCCH, wherein a number of ECCEs (Enhanced Control Channel Elements) included in each of the EPDCCH candidates is an aggregation level, wherein an interval between each of the EPDCCH candidates for one carrier at a specific aggregation level is determined based on a value of a total number of ECCEs included in the at least one resource block set divided by the specific aggregation level and a number of the EPDCCH candidates at the specific aggregation level.

In another aspect of the present invention, provided herein is a UE in a wireless communication system, including: a processor configured to receive an EPDCCH by monitoring EPDCCH candidates in at least one resource block set for the EPDCCH, wherein a number of ECCEs included in each of the EPDCCH candidates corresponds to an aggregation level, wherein the processor determines an interval between the EPDCCH candidates for one carrier at a specific aggregation level on the basis of a value obtained by dividing a total number of ECCEs included in the at least one resource block set by a product of the specific aggregation level and a number of the EPDCCH candidates at the specific aggregation level.

In the above-described embodiments, an interval between the EPDCCH candidates for the one carrier at the specific aggregation level may be determined by equation A.

$$\left\lfloor \frac{N_{ECCE,p,k}}{L \cdot M_p^{(L)}} \right\rfloor \qquad < \text{Equation A} >$$

($N_{ECCE,p,k}$ is a number of ECCEs included in a resource block set p of a subframe k, L is the specific aggregation level, and $M_p^{(L)}$ is a number of EPDCCH candidates at the specific aggregation level).

A position of EPDCCH candidate #m for other carrier at the specific aggregation level may be determined by applying an offset value into a position of the EPDCCH candidate #m for the one carrier at the specific aggregation level. The offset value may be determined based on a carrier index $n_{CI}$ of the other carrier.

A position of the EPDCCH candidate #m at the specific aggregation level L may be determined by equation B.

$$L\left\{\left(Y_{p,k} + \left\lfloor \frac{m \cdot N_{ECCE,p,k}}{L \cdot M_p^{(L)}} \right\rfloor + b\right) \bmod \lfloor N_{ECCE,p,k}/L \rfloor\right\} + \quad <\text{Equation B}>$$

$$i \text{ (where, } i = 0, \ldots, L-1)$$

($Y_{p,k}$ is a variable, $N_{ECCE,p,k}$ is a number of ECCEs included in a resource block set p of a subframe k, and $M_p^{(L)}$ is a number of EPDCCH candidates at the specific aggregation level, and b indicates an offset value determined based on a carrier index).

If the EPDCCH candidate #m is for the one carrier, the offset value may be 0, and if the EPDCCH candidate #m is for other carrier, the offset value may be configured as the carrier index $n_{CI}$ of the other carrier.

The variable $Y_{p,k}$ may be defined by equation C.

<Equation C>

$Y_{p,k}=(A \cdot Y_{p,k-1}) \bmod D$ ($A=39827$, $D=65537$, $k=\lfloor n_s/2 \rfloor$, $n_s$ indicates a slot index in one radio frame, $Y_{-1}=n_{RNTI} \neq 0$ and $n_{RNTI}$ indicates a UE ID).

According to embodiments of the present invention, it is possible to efficiently set a search space for a downlink control channel in a wireless communication system.

The effects of the present invention are not limited to the above-described effects and other effects which are not described herein will become apparent to those skilled in the art from the following description.

BRIEF DESCRIPTION OF THE DRAWINGS

FIG. 2, including views (a) and (b), illustrates a control-plane protocol stack and a user-plane protocol stack in a radio interface protocol architecture conforming to a 3GPP radio access network standard between a UE and an E-UTRAN;

FIG. 5, including views (a) and (b), illustrates resource units used to configure a downlink control channel in LTE;

FIG. 15, including views (a) and (b), illustrates an example of applying an offset in configuration of an EPDCCH sub-search space according to an embodiment of the present invention;

DETAILED DESCRIPTION OF THE INVENTION

Figure 1:
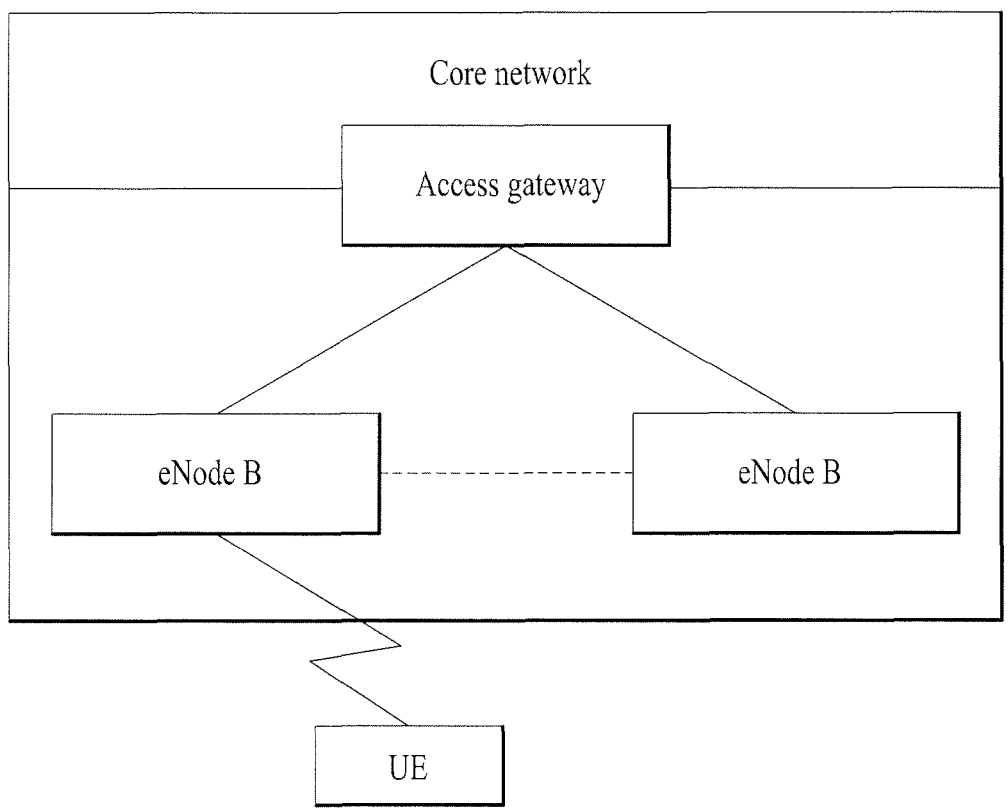
FIG. 1 illustrates a configuration of an E-UMTS network as an example of a wireless communication system.

The configuration, operation, and other features of the present invention will readily be understood with embodiments of the present invention described with reference to the attached drawings. Embodiments of the present invention as set forth herein are examples in which the technical features of the present invention are applied to 3GPP.

While embodiments of the present invention are described in the context of LTE and LTE-A, these embodiments are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

FIG. 2, including views (a) and (b), illustrates a control-plane protocol stack (FIG. 2(a)) and a user-plane protocol stack (FIG. 2(b)) in a radio interface protocol architecture conforming to a 3GPP wireless access network standard between a UE and an E-UTRAN. The control plane is a path along which the UE and the E-UTRAN transmit control messages to manage calls, and the user plane is a path along which data generated from an application layer, for example, voice data or Internet packet data is transmitted.

A physical (PHY) layer at Layer 1 (L1) provides information transfer service to a higher layer using physical channels. The PHY layer is connected to a medium access control (MAC) layer, which is a higher layer, via transport channels (transantenna port channels). The transport channels deliver data between the MAC layer and the PHY layer. Data is transmitted on physical channels between the PHY layers of a transmitter and a receiver. The physical channels use time and frequency as radio resources. Specifically, the physical channels are modulated using Orthogonal Frequency Division Multiple Access (OFDMA) for downlink and using Single Carrier Frequency Division Multiple Access (SC-FDMA) for uplink.

The MAC layer at Layer 2 (L2) provides service to a higher layer, i.e. a Radio Link Control (RLC) layer, via logical channels. The RLC layer at L2 supports reliable data transmission. RLC functionality may be implemented in a functional block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. An RB refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell constituting an eNB is set to one of the bandwidths of 1.44, 3, 5, 10, 15 and 20 MHz and provides DL or UL transmission service to a plurality of UEs in the bandwidth. Different cells may be configured so as to provide different bandwidths.

DL transport channels used to deliver data from the network to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
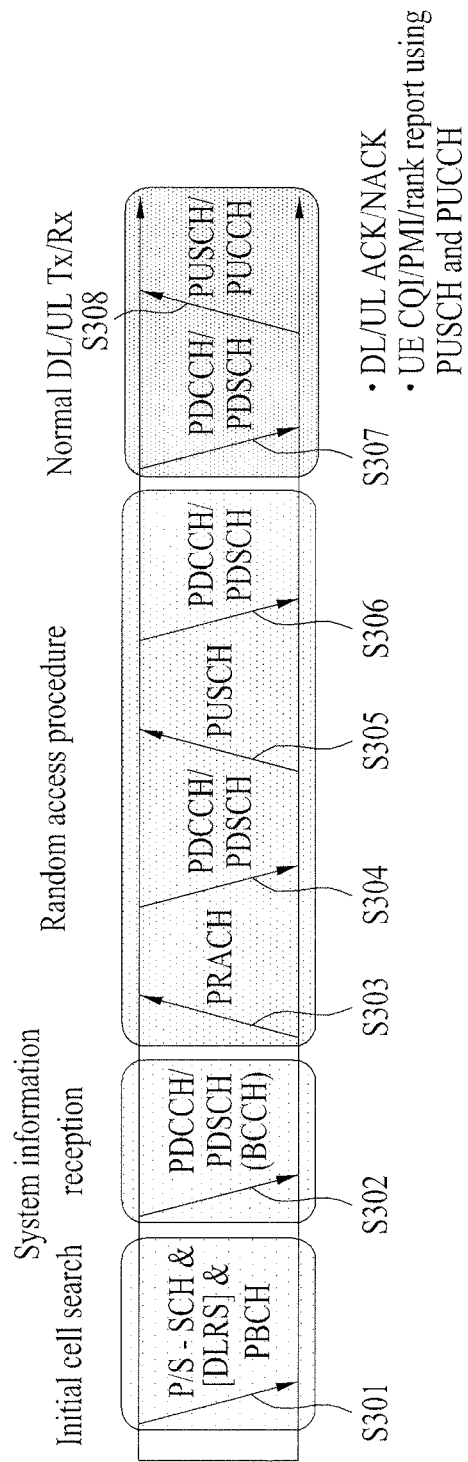
FIG. 3 illustrates physical channels used in a 3GPP system and a general signal transmission method using the physical channels.

FIG. 3 illustrates physical channels used in 3GPP and a general method for transmitting signals on the physical channels.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During initial cell search, the UE may monitor a DL channel state by receiving a Downlink Reference Signal (DL RS).

After initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on UL or receives from the eNB on DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In 3GPP LTE, the UE may transmit control information such as a CQI, a PMI, an RI, etc. on a PUSCH and/or a PUCCH.

Figure 4:
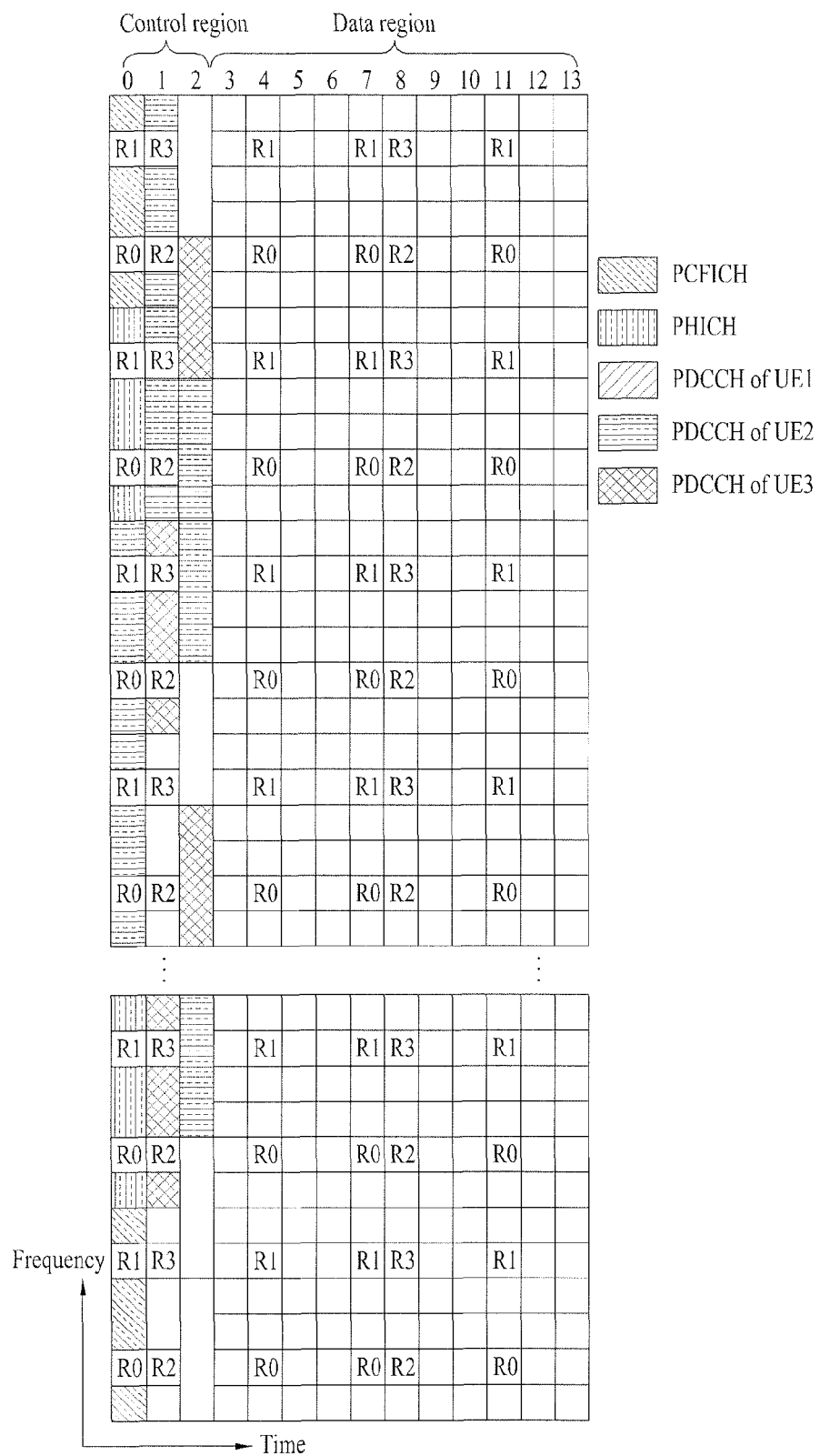
FIG. 4 illustrates a structure of a downlink radio frame used in LTE.

FIG. 4 illustrates control channels included in the control region of a subframe in a downlink radio frame.

Referring to FIG. 4, a subframe includes 14 OFDM symbols. A control region occupies the first one to three OFDM symbols and a data region occupies the other 13 to 11 OFDM symbols in the subframe according to the configuration of the subframe. In FIG. 4, reference characters R1 to R4 denote Reference Signals (RSs) or pilot signals for antenna 0 to antenna 3. RSs are transmitted in a predetermined pattern within a subframe irrespective of the control region and the data region of the subframe. Control channels are allocated to resources unused for RSs in the control region, and traffic channels are allocated to resources unused for RSs in the data region. The control channels of the control region are a Physical Control Format Indicator Channel (PCFICH), a Physical Hybrid-ARQ Indicator Channel (PHICH), a Physical Downlink Control Channel (PDCCH), etc.

The PCFICH indicates the number of OFDM symbols used for PDCCHs in every subframe to UEs. The PCFICH is located in the first OFDM symbol and configured with priority over the PHICH and the PDCCHs. The PCFICH includes four Resource Element Groups (REGs), each REG being distributed across the control region based on a cell Identity (ID). One REG has four REs. An RE is a minimum physical resource defined as one subcarrier by one OFDM symbol. A PCFICH value, which is modulated using Quadrature Phase Shift Keying (QPSK), ranges from 1 to 3 or from 2 to 4 according to a bandwidth.

The PHICH carries HARQ ACK/NACK for uplink transmission. That is, the PHICH is a channel used to deliver HARQ ACK/NACK for uplink HARQ. The PHICH includes one REG and is scrambled cell-specifically. The ACK/NACK is indicated in one bit and modulated using Binary Phase Shift Keying (BPSK). The modulated ACK/NACK is spread with a Spreading Factor (SF) of 2 or 4. A plurality of PHICHs is mapped to the same resources form a PHICH group. The number of PHICHs multiplexed into a PHICH group is determined according to the number of spreading codes. The same PHICH (group) occurs three times to achieve a diversity gain in the frequency and/or time domain.

A PDCCH is allocated to the first n OFDM symbols of a subframe. Here, n is 1 or a larger integer indicated by the PCFICH. The PDCCH includes one or more Control Channel Elements (CCEs). The PDCCH is used to inform a UE or a UE group of the resource allocation of transport channels, namely a PCH and a Downlink SCH (DL-SCH), an uplink scheduling grant, and HARQ information. The PCH and the DL-SCH are transmitted on a PDSCH. Therefore, the eNB and the UE transmit and receive data on a PDSCH except for particular control information or service data.

Information about the destination (one or more UEs) of data of a PDSCH and information about how the UEs should receive and decode the PDSCH data is delivered on a PDCCH. For example, if the Cyclic Redundancy Check (CRC) of a particular PDCCH is masked by Radio Network Temporary Identity (RNTI) "A" and information about data transmitted in radio resources "B" (e.g. a frequency position) with DCI format "C" being a transport format (e.g. a Transport Block (TB) size, a modulation scheme, coding information, etc.) is transmitted in a particular subframe, then UEs within the cell of the eNB monitor the PDCCH using their RNTI information. If one or more UEs have RNTI "A", then the UEs receive the PDCCH and receive a PDSCH indicated by "B" and "C" based on the received information of the PDCCH.

FIG. 5, including views (a) and (b), illustrates resource units used to configure a downlink control channel in LTE. FIG. 5(a) shows a case in which the number of transmit (Tx) antennas is 1 or 2 and FIG. 5(b) shows a case in which the number of Tx antenna is 4. Although a different RS pattern is used according to the number of Tx antennas, REs are configured for a DL control channel in the same manner.

Referring to FIG. 5, a basic resource unit of a DL control channel is an REG. The REG includes four contiguous REs except for REs carrying RSs. REGs are marked with bold lines in FIG. 5. A PCFICH and a PHICH include 4 REGs and 3 REGs, respectively. A PDCCH is configured in units of a control channel element (CCE), each CCE including 9 REGs.

To determine whether a PDCCH including L CCEs is transmitted to a UE, the UE is configured to monitor $M^{(L)}$ (≥L) CCEs that are arranged contiguously or according to a predetermined rule. L that the UE should consider for PDCCH reception may be a plural value. CCE sets that the UE should monitor to receive a PDCCH are referred to as a search space. For example, LTE defines search spaces as illustrated in Table 1.

TABLE 1

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

In Table 1, L is a CCE aggregation level, that is, the number of CCEs in a PDCCH, Sk(L) is a search space with CCE aggregation level L, and M(L) is the number of candidate PDCCHs to be monitored in the search space with CCE aggregation level L.

Search spaces are classified into a UE-specific search space accessible only by a specific UE and a common search space accessible by all UEs within a cell. A UE monitors common search spaces with CCE aggregation levels 4 and 8 and UE-specific search spaces with CCE aggregation levels 1, 2, 4, and 8. A common search space and a UE-specific search space may overlap each other.

For each CCE aggregation level, the position of the first CCE (a CCE having the smallest index) of a PDCCH search space allocated to a UE changes every subframe. This is called PDCCH search space hashing.

A CCE may be distributed across a system band. More specifically, a plurality of logically contiguous CCEs may be input to an interleaver and the interleaver may permute the sequence of the input CCEs on an REG basis. Accordingly, the time/frequency resources of one CCE are distributed physically across the total time/frequency region of the control region of a subframe. As a control channel is configured in units of a CCE but interleaved in units of an REG, frequency diversity gain and interference randomization gain may be maximized.

Figure 6:
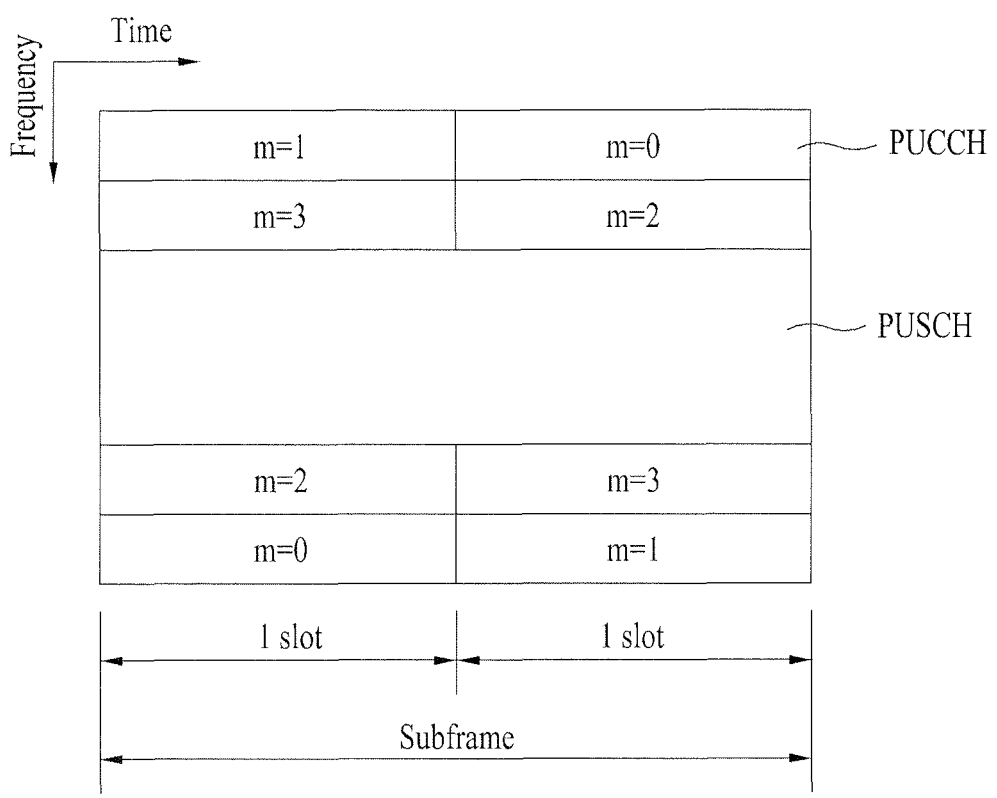
FIG. 6 illustrates a structure of an uplink subframe used in LTE.

FIG. 6 illustrates a structure of a UL subframe in LTE.

Referring to FIG. 6, a UL subframe may be divided into a region to which a physical uplink control channel (PUCCH) carrying control information is allocated and a region to which a physical uplink shared channel (PUSCH) carrying user data is allocated. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, and a scheduling request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 6.

Figure 7:
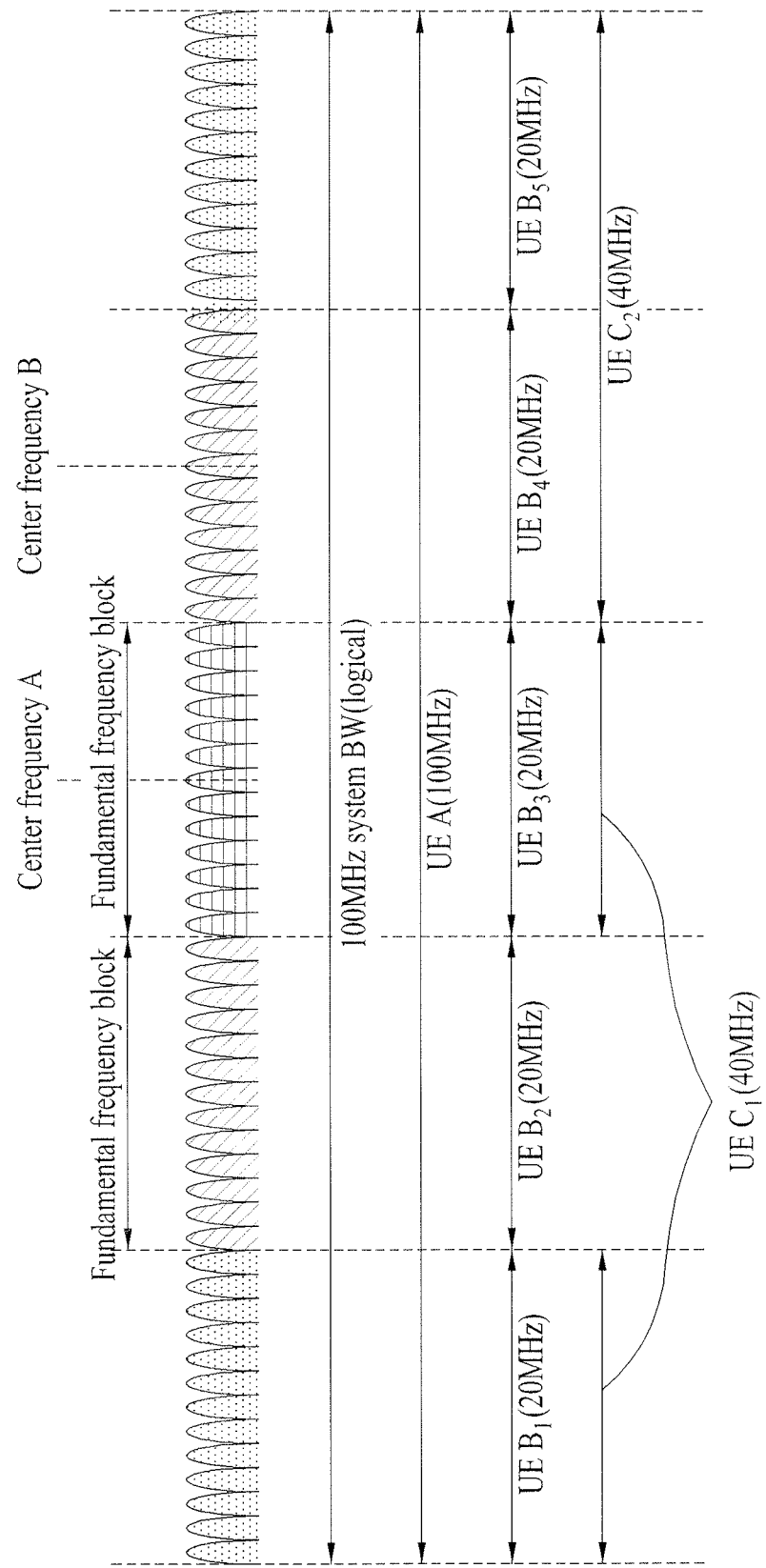
FIG. 7 illustrates carrier aggregation.

FIG. 7 illustrates carrier aggregation.

Carrier aggregation refers to a scheme in which a UE uses a plurality of frequency blocks or (logical) cells composed of UL resources (or component carriers) and/or DL resources (or component carriers) as one wider logical frequency band. According to carrier aggregation, a wireless communication can use a use a wider frequency band. Resources are represented by the term "component carrier" for convenience of description in the following Referring to FIG. 7, system bandwidth (BW) is a logical band having a bandwidth of up to 100 MHz. The system bandwidth includes 5 component carriers each of which has a bandwidth of up to 20 MHz. A component carrier includes one or more physically contiguous subcarriers. While the component carriers have the same bandwidth in FIG. 7, the component carriers may have different bandwidths. Furthermore, while the component carriers are contiguous in the frequency domain, FIG. 7 illustrates the logical concept and thus the component carriers may be physically contiguous or separated.

Different center frequencies may be respectively used for the component carriers or a common center frequency may be used for physically contiguous component carriers. For example, if all component carriers are physically contiguous in FIG. 7, then a center frequency A can be used. When the component carriers are not physically contiguous, center frequencies A and B may be used.

A component carrier may correspond to the system bandwidth of a legacy system in the specification. It is possible to easily provide backward compatibility and facilitate system design in a wireless communication environment in which an enhanced UE and a legacy UE coexist by defining the component carrier on the basis of the legacy system.

When total system bandwidth is extended according to carrier aggregation, 100 MHz can be used for communication with each UE and communication is performed using all 5 component carriers. UEs B1 to B5 may use only the bandwidth of 20 MHz and perform communication using one component carrier. UEs C1 and C2 may use 40 MHz and performs communication using two component carriers, respectively. These two component carriers may be logically/physically contiguous or noncontiguous. UE C1 corresponds to a case in which two noncontiguous component carriers are used and UE C2 corresponds to a case in which two contiguous component carriers are used.

One DL component carrier and one UL component carrier are used in LTE, whereas a plurality of component carriers may be used in LTE-A, as shown in FIG. 6. Methods for a control channel to schedule a data channel can be divided into linked carrier scheduling and cross carrier scheduling.

More specifically, according to linked carrier scheduling, a control channel transmitted through a specific component carrier schedules only a data channel through the specific component carrier as in the LTE system which uses a single component carrier.

According to cross carrier scheduling, a control channel transmitted through a primary component carrier (CC) schedules a data channel transmitted through the primary CC or another CC using a carrier indicator field (CIF).

A description will be given of a method of designating positions of PDCCH candidates in a search space on the basis of the above description.

The number of CCEs configured in a predetermined subframe k is defined as $N_{CCE,k}$ and it is assumed that indexes of the CCEs are 0 to $N_{CCE,k}-1$. In this case, positions of PDCCH candidates m=0, ..., $M^{(L)}-1$ of the corresponding aggregation level L in a search space $S_k^{(L)}$ (L ∈ {1,2,4,8}) are defined by the following expression in 3GPP.

[Expression 1]

$$L\{(Y_k+m')\bmod\lfloor N_{CCE,k}/L\rfloor\}+i$$

In Expression 1, m' is set as m'=m in the case of common search space. If the CIF is not defined even in the case of UE-specific search space, that is, if cross carrier scheduling is not applied, m' is set such that m'=m . When the CIF is defined in the case of UE-specific search space, that is, when cross carrier scheduling is applied, m' is defined as m'=m+ $M^{(L)} \cdot n_{CI}$. Here, $n_{CI}$ denotes a CIF value.

In the case of common search space, $Y_k$ is set to 0. In the case of UE-specific search space, $Y_k$ may be defined by a hashing function as represented by Expression 2.

[Expression 2]

$$Y_k=(A \cdot Y_{k-1})\bmod D$$

In Expression 2, A=39827, D=65537, k=$\lfloor n_s/2 \rfloor$ and $n_s$ indicates a slot index in one radio frame. In addition, an initial value may be set such that $Y_{-1}=n_{RNTI}\neq 0$ where $n_{RNTI}$ denotes a UE identifier.

In the current wireless communication environment, data throughput for a cellular network is rapidly increasing with the emergence and propagation of various devices requiring M2M (machine-to-machine) communication and high data throughput. To meet high data throughput, communication technology evolves to carrier aggregation for enabling efficient use of a larger number of frequency bands, MIMO for increasing data capacity within a limited frequency band, and coordinated multi-point (CoMP) and communication environments evolves to environments in which the density of accessible nodes around a UE increases. A system having high-density nodes can show higher system performance according to cooperation among nodes. This scheme provides much higher performance than a scheme in which nodes operate as independent base stations (BSs) (which may be called advanced BSs (ABSs), Node-Bs (NBs), eNode-Bs (eNBs), access points (APs), etc.).

Figure 8:
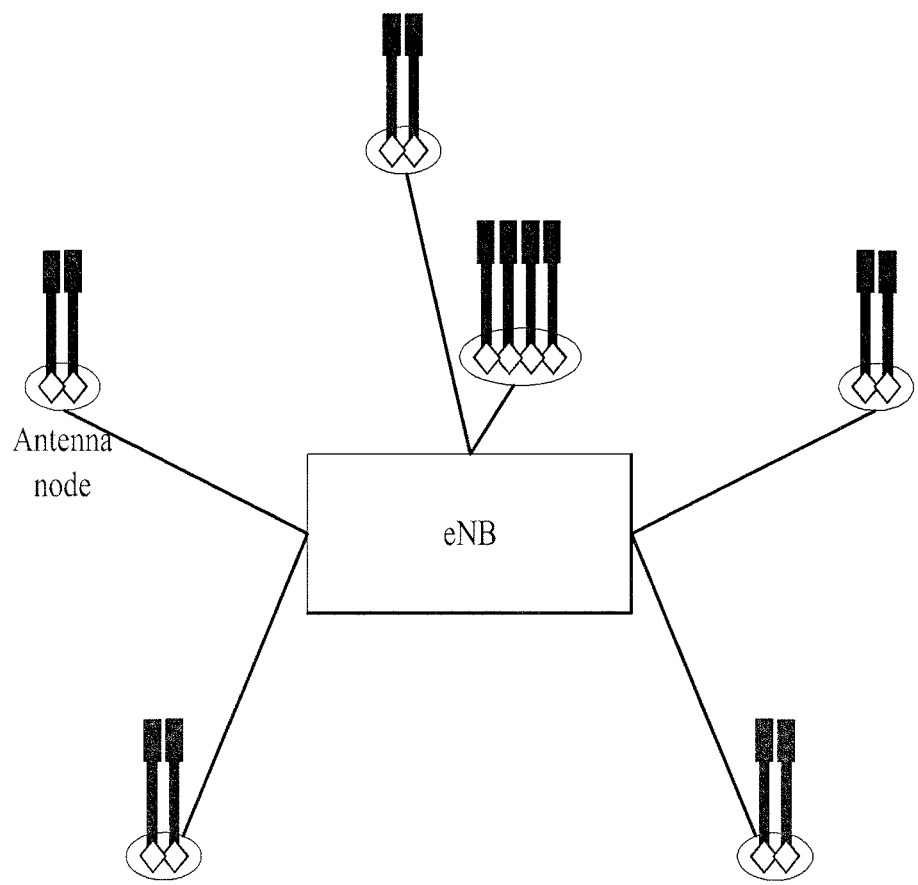
FIG. 8 illustrates a multi-node system from among next-generation communication systems.

FIG. 8 illustrates a multi-node system from among next-generation communication systems.

Referring to FIG. 8, when transmission and reception of all nodes are managed by one controller and thus the nodes operates as an antenna group of one cell, the system can be regarded as a distributed multi-node system (DMNS) which forms one cell. The individual nodes may be assigned respective node IDs or may operate as antennas in the cell without having node IDs. However, if the nodes have different cell identifiers IDs, then the system can be regarded as a multi-cell system. When multiple cells are configured in an overlapping manner according to coverage, this is called a multi-tier network.

A Node-B, eNode-B, PeNB, HeNB, RRH (Remote Radio Head), relay and distributed antenna can be a node and at least one antenna is installed in one node. A node may be called a transmission point. While nodes generally refer to a group of antennas spaced by a predetermined distance or more, nodes can be applied to the present invention even if the nodes are defined as an arbitrary antenna group irrespective of distance.

With the introduction of the aforementioned multi-node system and relay nodes, various communication schemes can be applied to improve channel quality. To apply MIMO and CoMP to multi-node environments, however, introduction of a new control channel is needed. Accordingly, an enhanced PDCCH (EPDCCH) is newly introduced as a control channel. The EPDCCH is allocated to the data region (referred to as a PDSCH region hereinafter) instead of the control region (referred to as a PDCCH region). Since control information about a node can be transmitted to each UE through the EPDCCH, PDCCH region shortage can be solved. For reference, the EPDCCH is not provided to legacy UEs and can be received only by LTE-A UEs. In addition, the EPDCCH is transmitted and received on the basis of a DM-RS (or CSI-RS) instead of a CRS corresponding to a cell-specific reference signal.

Figure 9:
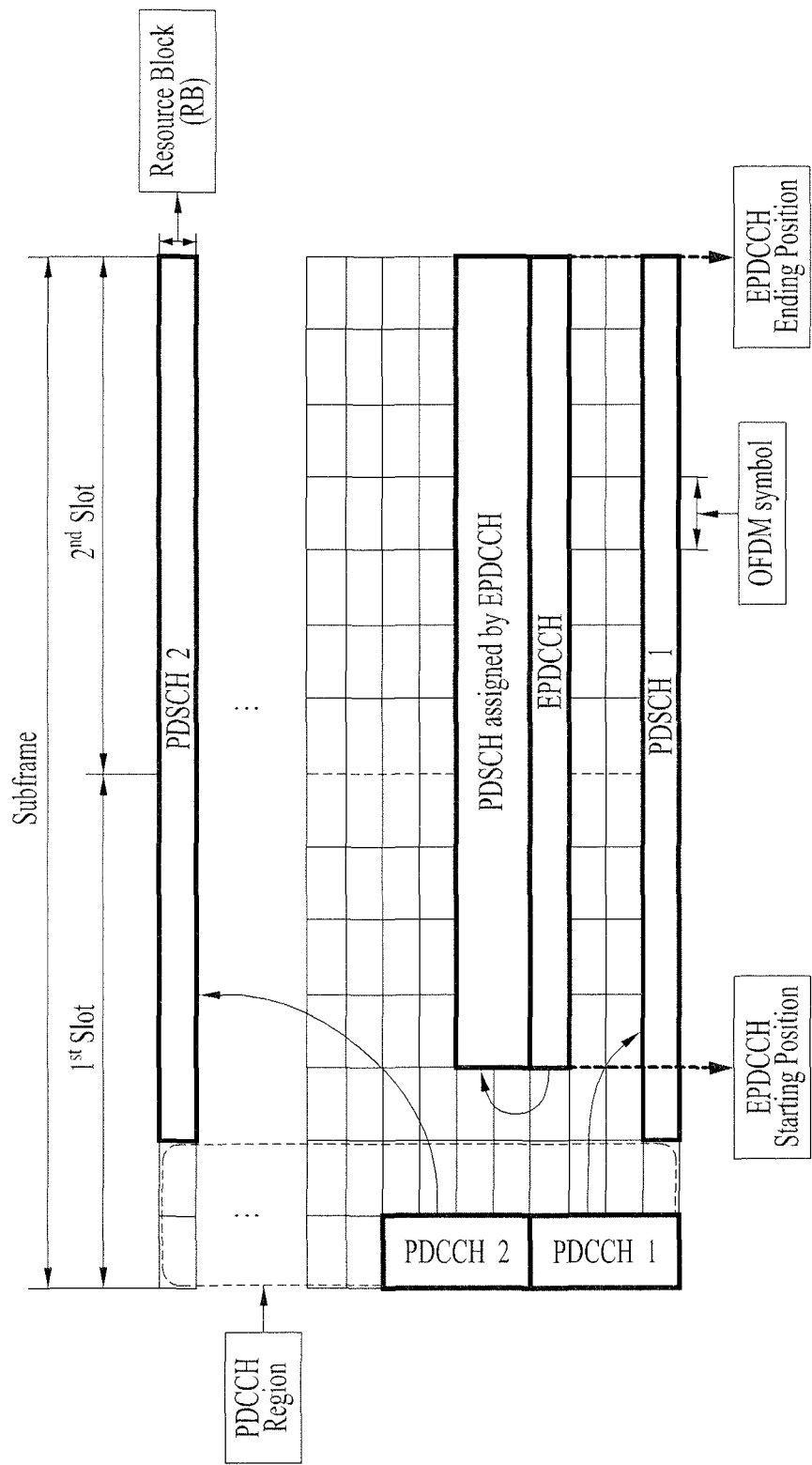
FIG. 9 illustrates an EPDCCH and a PDSCH scheduled by the EPDCCH.

FIG. 9 illustrates an example of an EPDCCH and a PDSCH scheduled by the EPDCCH.

Referring to FIG. 9, PDCCH 1 and PDCCH 2 respectively schedule PDSCH 1 and PDSCH 2 and the EPDCCH schedules another PDSCH. FIG. 9 shows that the EPDCCH is transmitted, starting from the fourth symbol of the corresponding subframe to the last symbol.

EPDCCHs can be transmitted through the PDSCH region used to transmit data and a UE monitors EPDCCHs in order to detect presence or absence of an EPDCCH destined therefor. That is, to obtain DCI included in the EPDCCH, the UE needs to perform blind decoding for a predetermined number of EPDCCH candidates in a search space with aggregation level L. Like the aggregation level of the search space for the PDCCH, the aggregation level of the search space for the EPDCCH refers to the number of enhanced CCE (ECCEs) used to transmit DCI.

A description will be given of a case in which the UE respectively assumes 6, 6, 2 and 2 EPDCCH candidates for aggregation levels L ∈{1,2,4,8} and detects a PDCCH.

However, the present invention is not limited thereto and is applicable to a case in which a different number of EPDCCH candidates are detected.

The EPDCCH is transmitted using a specific RB set, distinguished from the PDCCH. Particularly, an RB set through which the EPDCCH can be transmitted is preferably limited in order to reduce control channel overhead and to avoid resource collision with the PDSCH. Accordingly, an eNB can signal an RB set through which the EPDCCH can be transmitted to the UE through a higher layer signal and the UE can attempt detection on the assumption that the EPDCCH is transmitted only within the signaled RBs.

In general, the number of REs used to transmit DCI in a PRB pair corresponding to a combination of first and second slots having the same PRB index is considerably large. Accordingly, it is desirable to divide one PRB pair into a plurality of resource sets and transmit the EPDCCH by appropriately using the resource sets. For example, one PRB pair can be divided into 4 resource sets and each resource set can be regarded as one ECCE. In this case, the EPDCCH corresponding to aggregation level L is transmitted using L ECCEs. Otherwise, one PRB pair can be divided into 8 resource sets, every two resource sets can be grouped into one ECCE and the EPDDCH corresponding to aggregation level L can be transmitted using L ECCEs. In this case, resource sets belonging to different PRB pairs may form one ECCE for frequency diversity.

The number of EPDCCH candidates is preferably maintained to be identical to the number of PDCCH candidates in order to reuse a blinding decoding circuit for the PDCCH. If a sufficient number of PRB pairs is set and thus EPDCCH candidates for respective aggregation levels can be configured such that the EPDCCH candidates do not overlap, then 6, 6, 2 and 2 EPDCCH candidates, which correspond to the number of PDCCH candidates, are respectively assumed for aggregation levels L $\in\{1,2,4,8\}$ and the EPDCCH is detected.

Figure 10:
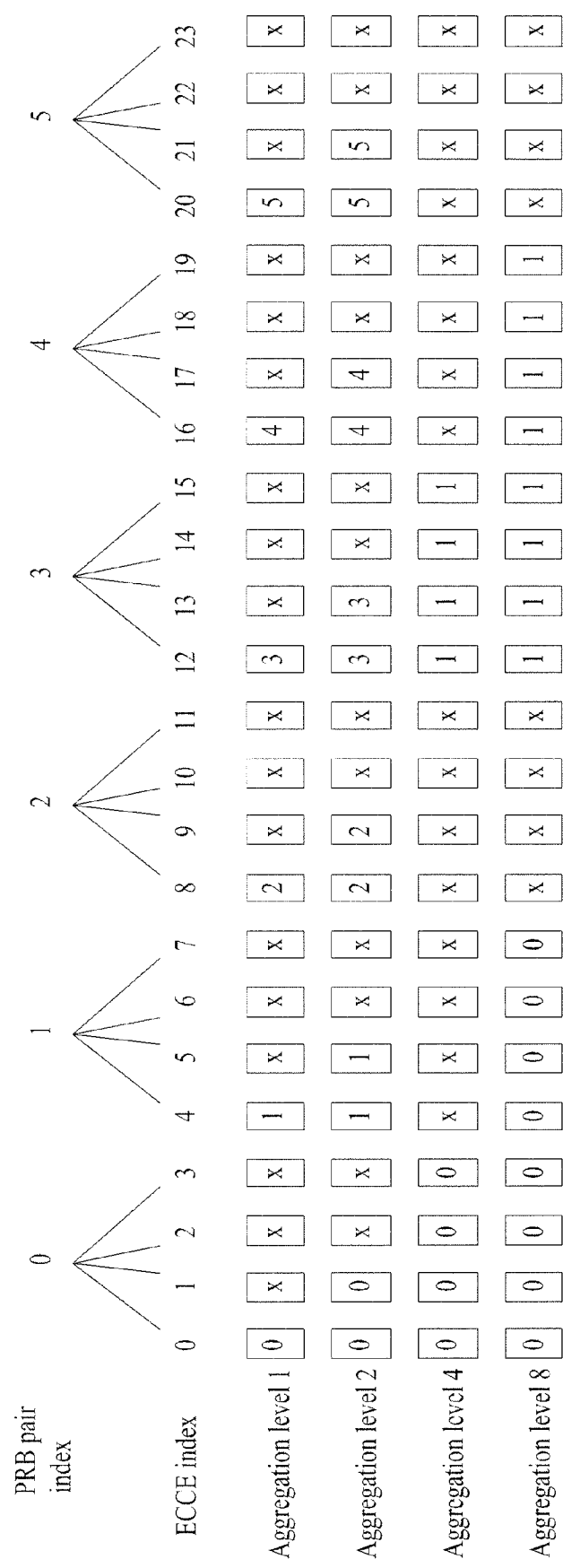
FIG. 10 illustrates EPDCCH candidates configured in 6 PRB pairs for blind decoding of an EPDCCH.

FIG. 10 illustrates EPDCCH candidates configured in 6 PRB pairs for blind decoding of an EPDCCH.

Referring to FIG. 10, 6 PRB pairs are set for the EPDCCH and one PRB pair is divided into 4 ECCEs. The PRB pairs may be contiguous or distributed. EPDCCH candidates corresponding to aggregation level #1 may be located in different PRB pairs to increase frequency selective diversity during EPDCCH transmission.

In FIG. 10, positions of EPDCCH candidates at each aggregation level are determined such that the EPDCCH candidates are spaced as far apart as possible. For example, since two EPDCCH candidates are present in the case of aggregation level #4, the two EPCCH candidates are respectively located in PRB pairs #0 and #3 having a spacing of 2 PRB pairs therebetween.

Figure 11:
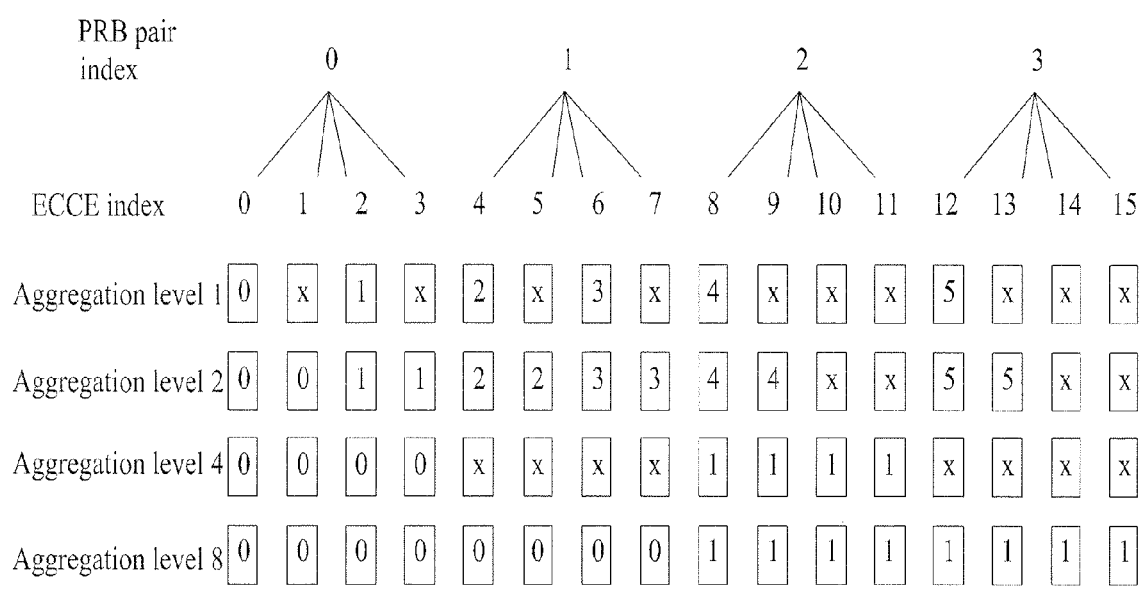
FIG. 11 illustrates EPDCCH candidates configured in 4 PRB pairs for blind decoding of an EPDCCH.

FIG. 11 illustrates EPDCCH candidates configured in 4 PRB pairs for blind decoding of an EPDCCH.

Referring to FIG. 11, 4 PRB pairs are set and two EPDCCH candidates at aggregation level #1 are configured for some PRB pairs such that 6 EPDCCH candidates are configured for 4 PRB pairs. In FIG. 11, two EPDCCH candidates at aggregation level #1 are present in PRB pairs #0 and #1.

In addition, the spacing between the EPDCCH candidates at aggregation level #1 is reduced compared to that in FIG. 10. More specifically, the spacing between EPDCCHs #0 and #1 is 4 ECCEs in the case of FIG. 10, which uses a larger number of PRB pairs (that is, the index of EPDCCH candidate #1 is determined as 'index of EPDCCH candidate #0 +4'), whereas the spacing between EPDCCHs #0 and #1 is 2 ECCEs in the case of FIG. 11, which uses a smaller number of PRB pairs. This can be implemented by adjusting the spacing between EPDCCH candidates according to the number of PRB pairs set to the EPDCCH and the number of ECCEs configured in one PRB pair.

For example, when N PRB pairs are set while K ECCEs are formed per PRB pair, a total of K·N ECCEs is configured. Accordingly, EPDCCH candidate spacing at aggregation level # L can be determined as $$X = \frac{K \cdot N}{M^{(L)}}.$$

Here, $M^{(L)}$ denotes the number of EPDCCH candidates at aggregation level #L. To integerize the number of EPDCCH candidates, a function such as floor (X), ceil(X) or the like may be applied. floor(X) represents a maximum integer equal to or less than X and ceil(X) represents a minimum integer equal to or greater than X.

A description will be given of a method of configuring EPDCCH candidates in an environment to which carrier aggregation is applied according to an embodiment of the present invention.

In configuration of an EPDCCH, a UE may signaled a set of RBs (or a set of PRBs) in which EPDCCH candidates are present through a higher layer signal such as an RRC signal. That is, a base station predetermines a set of RBs in which an EPDCCH can be transmitted and operates such that the corresponding UE attempts to detect an EPDCCH only in the corresponding RBs. Accordingly, a region that needs to be searched by the UE can be reduced and UE implementation can be simplified.

However, when one component carrier carries control signals with respect to other component carriers in a situation to which carrier aggregation is applied, that is, when cross carrier scheduling is applied, the number of EPDCCH candidates required per aggregation level may increase. In this case, an operation of controlling a spacing between EPDCCH candidates or overlapping ECCEs constituting EPDCCH candidates is required. This operation can be controlled by the number of cross-carrier-scheduled component carriers.

Figure 12:
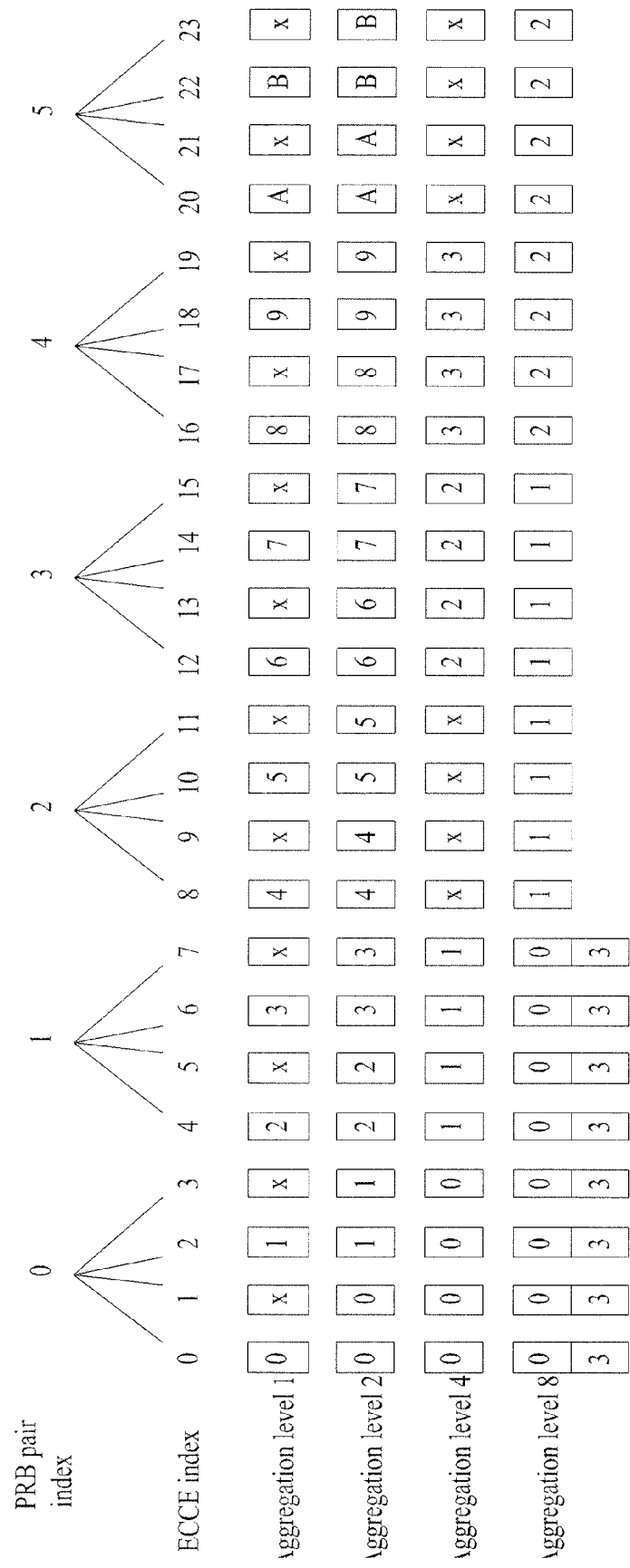
FIG. 12 illustrates EPDCCH candidates configured in 6 PRB pairs for blind decoding of an EPDCCH in an environment to which carrier aggregation is applied according to an embodiment of the present invention.

FIG. 12 illustrates EPDCCH candidates configured in 6 PRB pairs for blind decoding of an EPDCCH in an environment where carrier aggregation is applied according to an embodiment of the present invention. In FIG. 12, A and B respectively denote EPDCCH candidates #10 and #11.

Referring to FIG. 12, a spacing corresponding to 2 ECCEs is set between EDPDCCH candidates of aggregation levels #1 and #2. While EPDCCH candidate #3 of aggregation level #8 is configured such that EPDCCH candidate #3 and EPDCCH candidate #0 overlap since there is no extra resource in FIG. 12, EPDCCH candidates may be configured in a different combinations of ECCEs or the corresponding EPDCCH candidate may be deleted and the number of EPDCCH candidates of another aggregation level may be increased by applying the principle of the present invention.

As a generalization of the aforementioned operation of adjusting a spacing between EPDCCH candidates, when control signals for N component carriers are transmitted, the spacing Y between EPDCCH candidates may be set to X/N if the spacing in the case of one component carrier is set to X. To integerize this, a function such as floor(X), ceil(X) or the like may be applied. In addition, X may be limited such that X is greater than or equal to 1 all the time since the spacing between EPDCCH candidates needs to be maintained as at least 1 ECCE.

In the case of operation shown in FIG. 12, when EPDCCH candidates having consecutive indices are allocated to one component carrier, EPDCCH candidates allocated to a specific component carrier may be concentrated on a specific PRB pair. In this case, control signal transmission opportunity with respect to the corresponding component carrier may be reduced when channel state of the corresponding PRB pair is deteriorated. To solve this problem, EPDCCH candidates can be alternately allocated to component carriers.

Referring back to FIG. 12, when EPDCCH candidate #0 is allocated to component carrier #0, EDPCCH candidate #1 is allocated to component carrier #1 and EPDCCH candidate #2 is allocated to component carrier #2. When two component carriers are set, EPDCCH candidates with even-numbered indices are allocated to component carrier #0 and EPDCCH candidates with odd-numbered indices are allocated to component carrier #1. According to generalization of this scheme, when control signals for N component carriers are transmitted, EPDCCH candidate #n is allocated to component carrier #(n mod N).

In addition, the spacing between EPDCCH candidates may be maintained as that when only one component carrier is present and a predetermined offset is applied between EPDCCH candidates corresponding to each component carrier.

Figure 13:
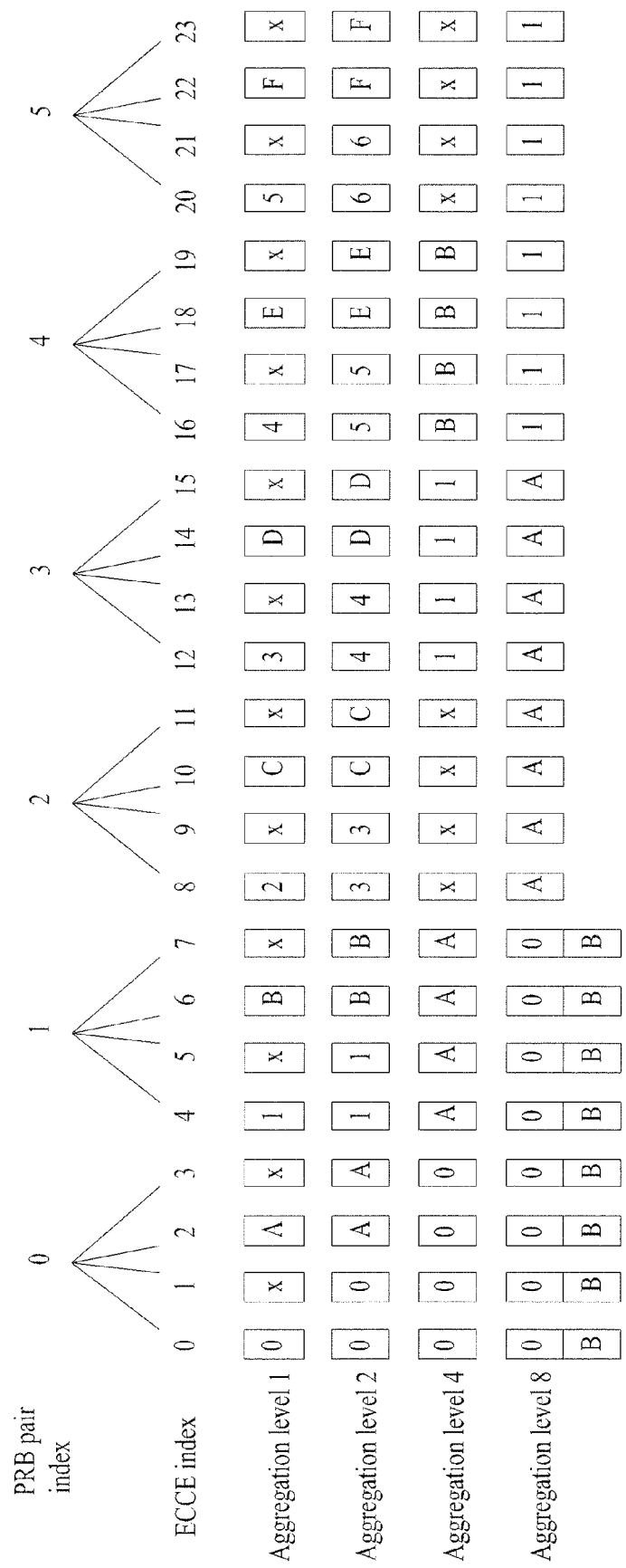
FIG. 13 illustrates EPDCCH candidates configured in 6 PRB pairs for blind decoding of an EPDCCH in an environment to which carrier aggregation is applied according to an embodiment of the present invention.

FIG. 13 illustrates another example of EPDCCH candidates configured in 6 PRB pairs for blind decoding of an EPDCCH in the environment where carrier aggregation is applied according to an embodiment of the present invention.

Referring to FIG. 13, when it is assumed that EPDCCH candidates #0, #1, . . . , #5 are allocated to component carrier #0 and EPDCCH candidates #A, #B, #F are allocated to component carrier #1, a search space is formed by providing an offset corresponding to 2 ECCEs between the component carriers while maintaining a spacing of 4 ECCEs between EPDCCH candidates corresponding to each component carrier.

The UE may receive RB sets for two or more EPDCCHs from the base station. For example, an RB set for an EPDCCH may be individually set for the UE per component carrier when cross carrier scheduling is applied. Even when the UE uses only one component carrier, a plurality of RB sets may be transmitted to the UE such that the UE simultaneously monitors EPDCCHs having different properties and may be configured to be respectively used to detect EPDCCHs having different properties. For example, one RB set can be configured to be used to detect an EPDCCH transmitted in a distributed manner and another RB set may be configured to be used to detect an EPDCCH transmitted in a localized manner.

The two cases may be combined. For example, when cross carrier scheduling is applied, a search space of each component carrier may be segmented into a plurality of sub-search spaces and separate RB sets may be transmitted for the respective sub-search spaces. When a search space of a component carrier is not segmented, the search space may be regarded as one sub-search space.

A description will be given of a method of determining positions of EPDCCHs in each sub-search space for a specific UE when a plurality of sub-search spaces is set for the UE.

Figure 14:
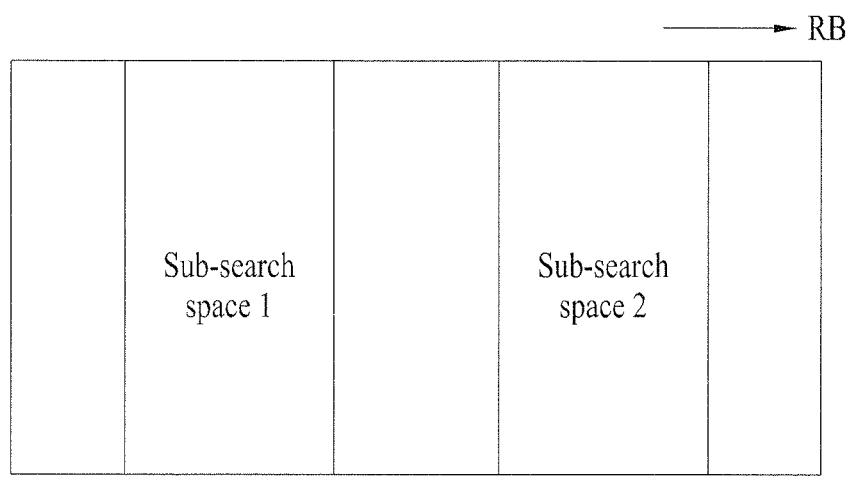
FIG. 14 illustrates an exemplary configuration of a plurality of sub-search spaces for one UE according to an embodiment of the present invention.

FIG. 14 illustrates an exemplary configuration of a plurality of sub-search spaces for one UE according to an embodiment of the present invention. In FIG. 14, a conventional PDCCH region is not shown for convenience of description.

While it is assumed that consecutive RBs constitute one sub-search space in FIG. 14, this is exemplary and nonconsecutive RBs may constitute one sub-search space. It is assumed that an ECCE index is given per sub-search space because it is difficult to provide the same ECCE index to all UEs since different sub-search spaces are configured for respective UEs. Consequently, while an ECCE has a unique index in each sub-search space, ECCEs having the same index may be present in different sub-search spaces and may occupy the same position in PRBs.

The position of an EPDCCH candidate in a search space may be defined by an ECCE index like a conventional PDCCH position and may be defined by a hash function for randomization of EPDCCH candidate positions between UEs.

In the conventional PDCCH search space described with reference to Expression 1, the parameter $Y_k$ is set to different values for respective UEs and thus different UEs set PDCCH candidates in different positions. Even when a plurality of sub-search spaces is set for a UE, positions of EPDCCH candidates may be defined in a manner similar to the manner of setting positions of PDCCH candidates. That is, the parameter $Y_k$ that is set to different values for UEs is introduced and positions of EPDCCH candidates are determined on the basis of the parameter $Y_k$. The simplest method is to independently set the parameter $Y_k$ per sub-search space.

For example, when a parameter applied to sub-search space #p is $Y_{k,p}$, an initial value $Y_{-1}$ of the parameter is determined on the basis of a parameter determined according to p. For instance, $Y_{-1}=f(p)$. Here, a function $f(p)$ can be defined as Expression 3 or Expression 4.

[Expression 3]

$$f(p)=n_{RNTI}+p$$

[Expression 4]

$$f(p)=n_{RNTI} \cdot (p+1)$$

Furthermore, when multiple component carriers are set, if T(c) sub-search spaces are configured for component carrier #c, then it can be considered that sub-search spaces #0, #1, . . . ,#T(0)−1 respectively correspond to sub-search spaces #1, #2, . . . , #T(0) of component carrier #0 and sub-search spaces #T(0) #T(0)+1, . . . , #T(0)+T(1)−1 respectively correspond to sub-search spaces #1, #2, . . . , #T(1) of component carrier #2.

Alternatively, the parameter $Y_{k,p}$ may be set to be associated with each sub-search space. For example, $Y_{k,p}=Y_k+g(p)$. That is, a predetermined offset can be added to an offset of one sub-search space to determine an offset of the next sub-search space.

FIG. 15, including views (a) and (b), illustrates an example of applying an offset in configuration of an EPDCCH sub-search space according to an embodiment of the present invention.

Referring to FIG. 15, the operation of applying an additional offset to an offset of one sub-search space to determine the next sub-search space may be effectively performed when the two sub-search spaces overlap. In FIG. 15, it is assumed that each sub-search space is configured using consecutive ECCEs and the two sub-search spaces have the same RB set in order to reduce control channel overhead.

When sub-search space #0 and sub-search space #1 have independent offset values $Y_{k,p}$, EPDCCH candidates of one sub-search space and EPDCCH candidates of the other sub-search space may be set to the same ECCEs and thus the number of EPDCCH candidates that can be used by a corresponding UE may be reduced, as shown in FIG. 15(a). FIG. 15(a) shows that EPDCCH candidates corresponding to aggregation level 1 in sub-search space #0 and sub-search space #1 overlap since a condition of $Y_{k,1}=Y_{k,0}+1$ is satisfied at a specific time.

When sub-search space #1 is configured in such a manner that an additional offset is added to the offset of sub-search space #0, as shown in FIG. 15(b), EPDCCH candidates in sub-search space #0 and EPDCCH candidates in sub-search space #1 do not overlap all the time at ECCE indexes after mapped to the same RB set. Accordingly, the problem described with reference to FIG. 15(a) can be solved.

To meet this condition, $Y_{k,p}$ needs to satisfy $Y_{k,p}=Y_{k,p-1}+\alpha$ and $\alpha$ needs to correspond to $M_{p-1}^{(L)}$ that is the number of EPDCCH candidates in sub-search space #p-1. That is, an offset value applied to aggregation level L can be defined by Expression 5.

[Expression 5]

$$Y^{(L)}_{k,p}=Y_k+\text{sum}(M_j^{(L)} \text{ for } j=0,1,\ldots,p-1)$$

$M_j^{(L)}$ denotes the number of EPDCCH candidates corresponding to aggregation level L in sub-search space #j and sum($M_j^{(L)}$ for j=0,1, ..., p-1) denotes the sum of $M_j^{(L)}$ of sub-search space #0 to sub-search space #p-1.

For example, when one component carrier search space is segmented into two sub-search spaces and the numbers of EPDCCH candidates respectively corresponding to aggregation levels L ∈{1,2,4,8} are {3,3,1,1} in one sub-search space, α can be given as 3, 3, 1 and 1 for aggregation levels L ∈{1,2,4,8}, respectively. This means that different offset values can be applied to aggregation levels. Similarly, when one component carrier has one sub-search space and the numbers of EPDCCH candidates respectively corresponding to aggregation levels L ∈{1,2,4,8} are {6,6,2,2} in one sub-search space, α can be given as 6, 6, 2 and 2 for aggregation levels L ∈{1,2,4,8}, respectively.

If one offset value is commonly applied to aggregation levels, then a value (i.e. $M_{p-1}^{(L)}$ in the case of aggregation level 1) or a value (i.e. max($M_{p-1}^{(L)}$ for L=1,2,4,8)) corresponding to a maximum number of EPDCCH candidates from among the numbers of EPDCCH candidates of all aggregation levels can be applied as the value α in $Y_{k,p}=Y_{k,p-1}+\alpha$.

In configuration of an EPDCCH search space, a predetermined gap may be present between EPDCCH candidates in order to prevent an EPDCCH candidate in an inappropriate environment (e.g. the EPDCHC candidate is present in a frequency region causing deep fading or is blocked by an EPDCCH candidate of a high aggregation level of another UE) from affecting other EPDCCH candidates by distributing EPDCCH candidates over the search space.

For example, when a gap of $G_{p,L}(\geq 1)$ is present between EPDCCH candidates at aggregation level L of sub-search space #p, the aforementioned search space configuration can be represented by Expression 6.

[Expression 6]

$$L\{(Y_k+G_{p,L}m') \bmod \lfloor N_{ECCE,k}/L \rfloor\}+i$$

In the case of aggregation level 1, when EPDCCH candidate #0 is configured at $Y_k$, an operation of generating EPDCCH candidate #1 at $Y_k+G_{p,L}$ and generating EPDCCH candidate #2 at $Y_k+2G_{p,L}$ is repeated.

Furthermore, α can be set such that $\alpha=G_{p-1,L} \cdot M_{p-1}^{(L)}$ in $Y_{k,p}=Y_{k,p-1}+\alpha$ in order to prevent EPDCCH candidates of two sub-search spaces from overlapping.

Figure 16:
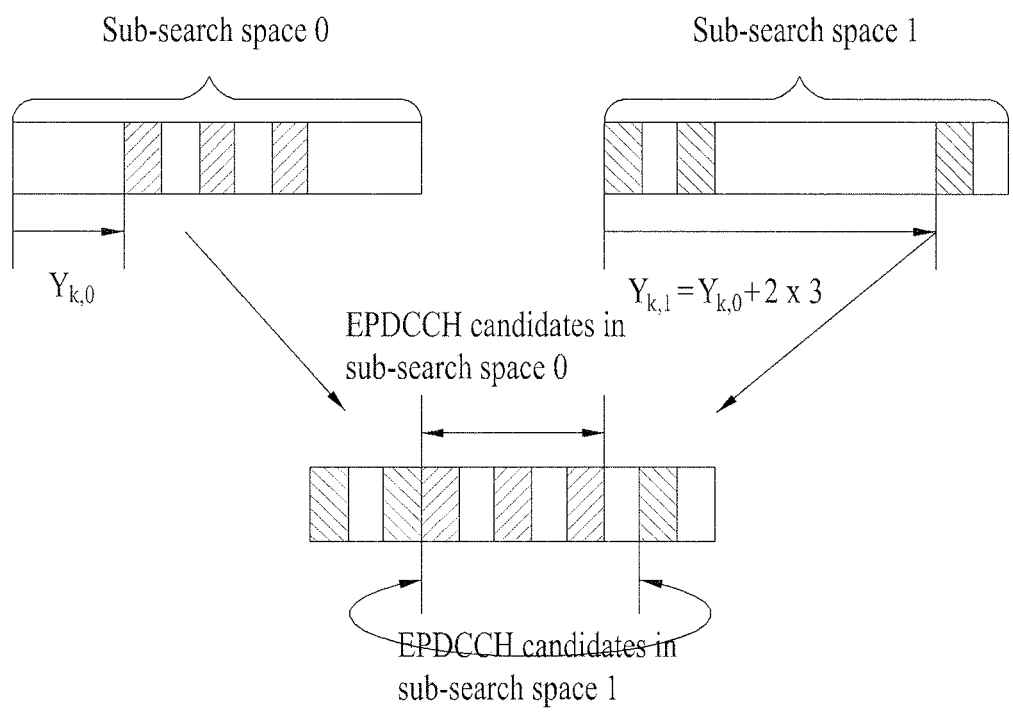
FIG. 16 illustrates an example of applying a predetermined gap between two sub-search spaces such that EPDCCH candidates of the sub-search spaces do not overlap according to an embodiment of the present invention.

FIG. 16 illustrates an example of applying a predetermined gap between two sub-search spaces such that EPDCCH candidates of the two sub-search spaces do not overlap according to an embodiment of the present invention.

FIG. 16 assumes that the gap is $G_{0,L}=G_{1,L}=2$. It can be confirmed from FIG. 16 that positions of EPDCCH candidates are circularly shifted according to a modulo operation for a total number of ECCEs in sub-search space #1.

In application of the principle of the present invention, when the offset value α is defined as a subframe index, an EPDCCH sub-search space index, a UE ID or the like, offsets among sub-search spaces can be randomized. In addition, α can be set depending on transmission type of each sub-search space, for example, depending on whether a corresponding EPDCCH is an EPDCCH of localized transmission (referred to as localized EPDCCH) in which individual ECCEs are present in only one PRB pair or an EPDCCH of distributed transmission (referred to as distributed EPDCCH) in which individual ECCEs are present in a plurality of PRB pairs.

A description will be given of detailed examples of determining an offset between sub-search spaces. In the case of localized EPDCCH, it is desirable to configure a search space such that EPDCCH candidates are evenly distributed in multiple PRB pairs.

Figure 17:
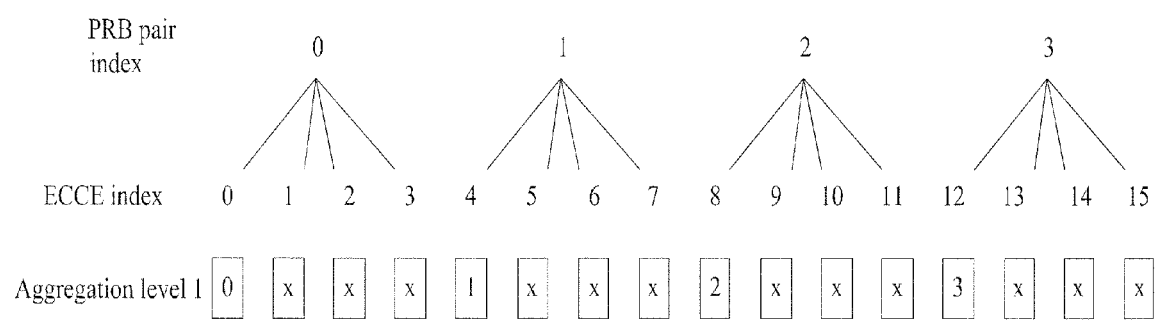
FIG. 17 illustrates an example of configuring EPDCCH candidates by applying an offset between sub-search spaces according to an embodiment of the present invention.

FIG. 17 illustrates an example of configuring EPDCCH candidates by applying an offset between sub-search spaces according to an embodiment of the present invention. Particularly, FIG. 17 shows a case in which 4 PRB pairs are set, 4 ECCEs are formed per PRB pair and 4 EPDCCH candidates corresponding to aggregation level 1 are respectively located in the 4 PRB pairs.

More generally, a localized EPDCCH search space can be configured as represented by Expression 7. In Expression 7, starting ECCE indexes of $L \cdot M_p^{(L)}$ EPDCCH candidates are arranged in a total of $N_{ECCE,k,p}$ ECCEs present in sub-search space #p as equally as possible for sub-search space #p.

[Expression 7]

$$L\left\{\left(Y_{k,p}+\left\lfloor\frac{N_{ECCE,k,p}}{L*M_p^{(L)}}m'\right\rfloor\right)\bmod\lfloor N_{ECCE,k,p}/L\rfloor\right\}+i$$

Figure 18:
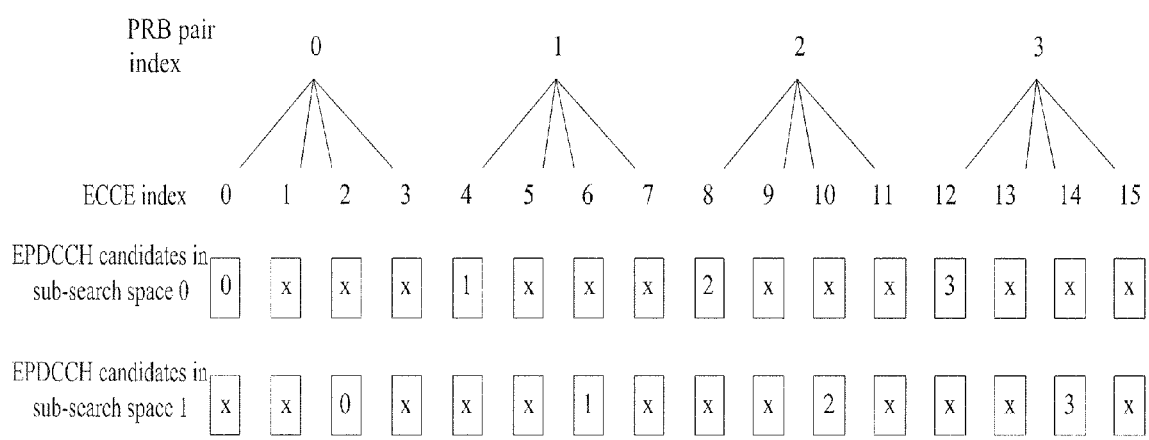
FIG. 18 illustrates an example of configuring EPDCCH candidates by applying an offset of 2 between two sub-search spaces according to an embodiment of the present invention.

In the sub-search space configured in this manner, unused ECCEs are present between EPDCCH candidates. Accordingly, if an offset of a specific value less than the gap between two EPDCCH candidates is applied between two sub-search spaces when the sub-search spaces overlap, then EPDCCH candidates of the two sub-search spaces do not overlap. FIG. 18 illustrates an example of configuring EPDCCH candidates by applying an offset of 2 between two sub-search spaces according to an embodiment of the present invention.

When Expression 7 is applied, a gap of $$\frac{N_{ECCE,k,p}}{L*M_p^{(L)}}$$

is present between two EPDCCH candidates and thus an offset between the two sub-search spaces can be represented as $$\frac{N_{ECCE,k,p}}{L*M_p^{(L)}} * \frac{p}{P}.$$

In this case, $Y_{k,p}$ can be represented as Expression 8.

$$Y_{k,p} = Y_k + \frac{N_{ECCE,k,p}}{L*M_p^{(L)}} * \frac{p}{P} \qquad \text{[Expression 8]}$$

Here, p is the number of sub-search spaces and p corresponds to the index of a corresponding sub-search space.

To consider distribution of EPDCCH candidates in sub-search space #p−1, $Y_{k,p}$ may be represented as Expression 9.

$$Y_{k,p} = Y_k + \frac{N_{ECCE,k,p}}{L*M_{p-1}^{(L)}} * \frac{p}{P} \qquad \text{[Expression 9]}$$

Alternatively, to avoid inconvenience of controlling the offset between sub-search spaces according to parameters, it is possible to prevent EPDCCH candidates of multiple sub-search spaces from overlapping by selecting the number of EPDCCH candidates at a specific aggregation level, for example, the number of EPDCCH candidates at aggregation level 1 or a maximum number of EPDCCH candidates (or a minimum number of EPDCCH candidates) as a representative value and commonly using the representative value instead of $M_p^{(L)}$ or setting the offset to a value obtained by multiplying a sufficiently small value such as 1, 2 or 3 by sub-search space index p.

In particular, when cross carrier scheduling using an EPDCCH is applied, the aforementioned method of applying the offset between sub-search spaces can be effectively used to prevent EPDCCH candidates of component carriers from overlapping and being set to the same ECCE.

That is, in an environment in which sub-search spaces #0, #1, . . . , #T(0)−1 respectively correspond to sub-search spaces #1, #2, . . . , #T(0) of component carrier #0 and sub-search search spaces #T(0), #T(0)+1, . . . , #T(0)+T(1)−1 respectively correspond to sub-search spaces #1, #2, . . . , #T(1) of component carrier #2, when an offset of $f(p)$ is applied to sub-search space #p, Expression 7 can be modified into Expression 10 such that the EPDCCH search space configuration rule is changed.

$$L\left\{\left(Y_{k,p} + f(p) + \left\lfloor\frac{N_{ECCE,k,p}}{L*M_p^{(L)}}m\right\rfloor\right)\bmod\lfloor N_{ECCE,k,p}/L\rfloor\right\} + i \qquad \text{[Expression 10]}$$

In Expression 10, m is a value varying in the range of 0 to $M_p^{(L)-1}$ and denotes a relative index of an EPDCCH candidate of a corresponding component carrier in a corresponding sub-search area. Particularly, m maintains a relative index in the corresponding component carrier irrespective of whether carrier aggregation is applied and an allocated CIF field, distinguished from m' in Expression 7. That is, m is not affected by $n_{CI}$ corresponding to a CIF value, distinguished from m'=m+$M_p^{(L)} \cdot n_{CI}$ of Expression 1. Accordingly, $M_p^{(L)}$ EPDCCH candidates can be equally distributed in all ECCE regions.

Expression 10 corresponds to a case in which sub-search spaces for component carriers are separately set. In this case, since the parameter $Y_{k,p}$ that determines a starting ECCE index of a search space need not be set to different values for respective sub-search spaces, $Y_{k,p}$ can be determined irrespective of sub-search space index p and simply represented as $Y_k$. In addition, $f(p)$ that determines an offset value may be simply defined as p.

When resources for sub-search spaces for respective component carriers are not separately configured, EPDCCH candidates of a plurality of component carriers can be set in resources configured for one sub-search space. It is assumed that sub-search spaces #0, #1, . . . , #T(0)−1 respectively correspond to sub-search spaces #1, #2, . . . , #T(0) of component carrier #0 and sub-search spaces #T(0), #T(0)+1, . . . , #T(0)+T(1)−1 respectively correspond to sub-search spaces #1, #2, . . . , #T(1) of component carrier #2.

In this case, resources for separate sub-search spaces are not individually set for respective component carriers. Instead, only resources for sub-search spaces with respect to one component carrier may be set and sub-search spaces for other component carriers may be operated in an integrative manner using resources for each sub-search space. More specifically, when T(0)=T(1)= . . . =T and thus T sub-search spaces are set per component carrier, only resources for a total of T sub-search spaces can be set and sub-search spaces #x, x+T and #x+2T corresponding to sub-search space #x of each component carrier can be formed using resources set for sub-search space #x. In addition, indexes for respective component carrier may be provided in order to discriminate EPDCCH candidates of different component carriers set in the same resources.

To discriminate EPDCCH candidates for respective component carriers, the EPDCCH search space configuration rule may be modified in such a manner that the offset function $f(p)$ is replaced by a function of component carrier index, $f(n_{CI})$, as represented by Expression 11.

$$L\left\{\left(Y_{k,p} + f(n_{CI}) + \left\lfloor\frac{N_{ECCE,k,p}}{L*M_p^{(L)}}m\right\rfloor\right)\bmod\lfloor N_{ECCE,k,p}/L\rfloor\right\} + i \qquad \text{[Expression 11]}$$

In Expression 11, $f(n_{CI})$ may be simply defined as $n_{CI}$.

In the case of distributed EPDCCH, positions of EPDCCH candidates are meaningless and thus a conventional search space configuration method can be reused. In this case, EPDCCH candidates appear on consecutive ECCEs in one sub-search space. Accordingly, to prevent EPDCCH candidates of sub-search spaces from overlapping, an offset between the sub-search spaces can be set to $$Y_{k,p} = Y_k + \sum_{j=0}^{p-1} M_j^{(L)},$$

as described with reference to FIG. 15.

Otherwise, to avoid inconvenience of controlling the offset between sub-search spaces according to various parameters, it is possible to select the number of EPDCCH candidates at a specific aggregation level, such as the number of EPDCCH candidates of aggregation level 1, a maximum number of EPDCCH candidates or a minimum number of EPDCCH candidates, as a representative value and commonly use the representative value instead of $M_p^{(L)}$ or to set the offset to a value obtained by multiplying a sufficiently large value such as 3, 4 or 6 by sub-search space index p, thereby preventing EPDCCH candidates of sub-search spaces from overlapping.

As to the aforementioned localized EPDCCH and distributed EPDCCH, one common offset value can be selected and applied to both the localized EDPCCH and distributed EPDCCH. When two sub-search spaces are set for a UE, total EPDCCH candidates need to be appropriately distributed in the two sub-search spaces. A maximum of six EPDCCH candidates is present in a search space for the PDCCH at one aggregation level when cross carrier scheduling is not applied. Accordingly, when two sub-search spaces are present and EPDCCH candidates are uniformly distributed in the two sub-search spaces, a maximum of three EPDCCH candidates is present in one sub-search space.

Accordingly, when the offset between sub-search spaces is set to 3, that is, $Y_{k,p}=Y_k+3p$, overlapping of EPDCCH candidates can be easily prevented for the localized EPDCCH and distributed EPDCCH. In the case of distributed EPDCCH, an offset modified into $Y_{k,p}=Y_k+3 \cdot B \cdot p$ may be defined in order to cope with an increase in the number of EPDCCH candidates due to cross carrier scheduling. Here, B is the number of scheduling component carriers from among corresponding component carriers.

Figure 19:
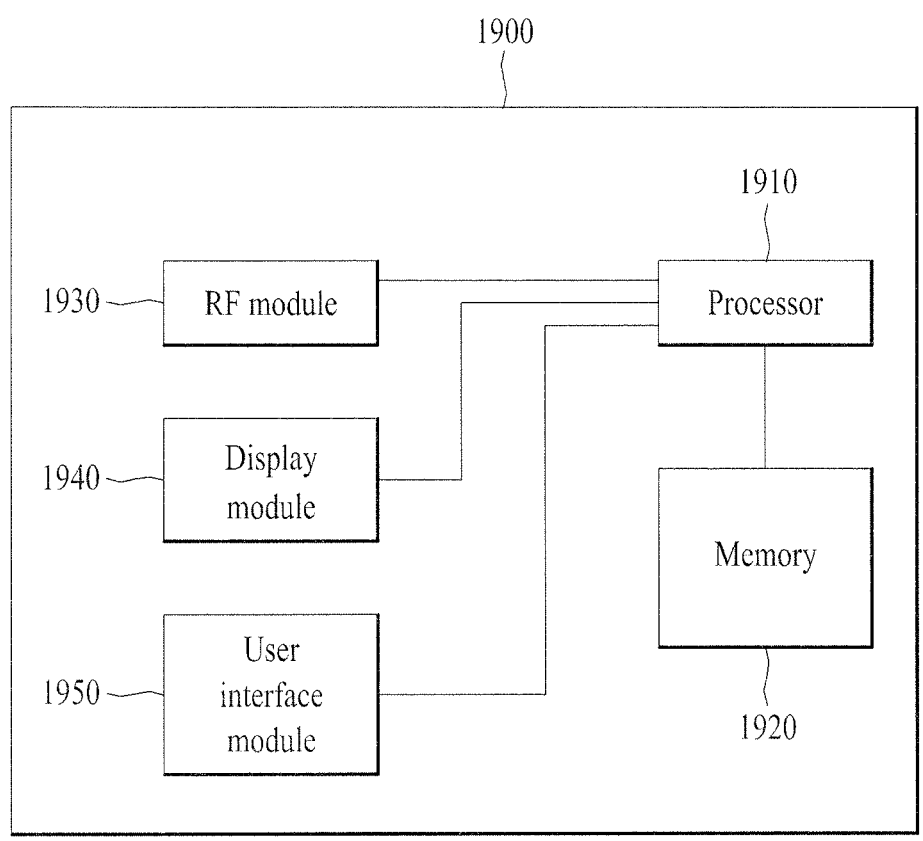
FIG. 19 is a block diagram of a communication apparatus according to an embodiment of the present invention.

FIG. 19 is a block diagram of a communication apparatus according to an embodiment of the present invention.

Referring to FIG. 18, a communication apparatus 1900 includes a processor 1910, a memory 1920, an RF module 1930, a display module 1940 and a user interface module 1950.

The communication apparatus 1900 is illustrated for convenience of description and some modules may be omitted. Furthermore, the communication apparatus 1900 may further include necessary modules. Some modules of the communication apparatus 1900 may be subdivided. The processor 1910 is configured to perform operations according to the embodiments of the present invention, described with reference to attached drawings. Refer to descriptions of FIGS. 1 to 18 for detailed operations of the processor 1910.

The memory 1920 is connected to the processor 1910 and stores an operating system, applications, program code, data, etc. The RF module 1930 is connected to the processor 1910 and converts baseband signals into RF signals or converts RF signals into baseband signals. To achieve this, the RF module 1930 performs analog conversion, amplification, filtering and frequency upconversion or reverse operations thereof. The display module 1940 is connected to the processor 1910 and displays various types of information. The display module 1940 may use a well-known element such as an LCD (Liquid Crystal Display), LED (Light Emitting Diode), OLED (Organic Light Emitting Diode) or the like. However, the display module 1940 is not limited thereto. The user interface module 1950 may be connected to the processor 1910 and configured in the form of a combination of well-known user interfaces such as a keypad, touchscreen and the like.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

While the method for setting a search space for a downlink control channel in a wireless communication system and the apparatus therefor have been described in the context of a 3GPP LTE system, the present invention is also applicable to many other wireless communication systems.

What is claimed is:

1. A method for receiving an Enhanced Physical Downlink Control Channel (EPDCCH) from a base station by a user equipment (UE) in a wireless communication system, the method comprising:
   receiving a first EPDCCH for a first carrier by monitoring first EPDCCH candidates for the first carrier in a specific physical resource block (PRB) pair set; and
   receiving a second EPDCCH for a second carrier by monitoring second EPDCCH candidates for the second carrier in the specific PRB pair set,
   wherein an interval between each of the first EPDCCH candidates at a specific aggregation level is determined based on a first value obtained by dividing a number of Enhanced Control Channel Elements (ECCEs) included in a resource block set of a subframe by a number of the second EPDCCH candidates at the specific aggregation level, and
   wherein a position of the second EPDCCH candidates is determined based on a second value obtained by adding the interval and an offset.

2. The method according to claim 1, the first EPDCCH and the second EPDCCH are transmitted via at least one aggregated carrier.

3. The method according to claim 1, wherein the offset is determined based on a carrier index of the second carrier.

4. The method according to claim 1, wherein a number of ECCEs included in each of the first EPDCCH candidates and the second EPDCCH candidates is an aggregation level.

5. The method according to claim 4, wherein the position of each of the second EPDCCH candidates #m at the specific aggregation level L is determined by equation A:

$$L\left\{\left(Y_{p,k} + \left\lfloor \frac{m \cdot N_{ECCE,p,k}}{L \cdot M_p^{(L)}} \right\rfloor + b\right) \bmod \lfloor N_{ECCE,p,k}/L \rfloor \right\} + i,  \quad \text{<Equation A>}$$

where i=0, ..., L−1, $Y_{p,k}$ is a variable, $N_{ECCE,p,k}$ is a of number ECCEs included in the resource block set p of a subframe k, $M_p^{(L)}$ is a number of EPDCCH candidates at the specific aggregation level, and b indicates the offset determined based on a carrier index.

6. A user equipment (UE) in a wireless communication system, the UE comprising:
 a radio frequency (RF) module; and
 a processor connected to the RF module and configured to:
 receive, via the RF module, a first Enhanced Physical Downlink Control Channel (EPDCCH) for a first carrier by monitoring first EPDCCH candidates for the first carrier in a specific physical resource block (PRB) pair set; and
 receive, via the RF module, a second EPDCCH for a second carrier by monitoring second EPDCCH candidates for the second carrier in the specific PRB pair set,
 wherein an interval between each of the first EPDCCH candidates at a specific aggregation level is determined based on a first value obtained by dividing a number of Enhanced Control Channel Elements (ECCEs) included in a resource block set of a subframe by a number of the second EPDCCH candidates at the specific aggregation level, and
 wherein a position of the second EPDCCH candidates is determined based on a second value obtained by adding the interval and an offset.

7. The UE according to claim 6, wherein the first EPDCCH and the second EPDCCH are transmitted via at least one aggregated carrier.

8. The UE according to claim 6, wherein the offset is determined based on a carrier index of the second carrier.

9. The UE according to claim 6, wherein a number of ECCEs included in each of the first EPDCCH candidates and the second EPDCCH candidates is an aggregation level.

10. The UE according to claim 9, wherein the position of the each of the second EPDCCH candidates #m at the specific aggregation level L is determined by equation A:

$$L\left\{\left(Y_{p,k} + \left\lfloor \frac{m \cdot N_{ECCE,p,k}}{L \cdot M_p^{(L)}} \right\rfloor + b\right) \bmod \lfloor N_{ECCE,p,k}/L \rfloor \right\} + i,  \quad \text{<Equation A>}$$

where i=0, ..., L−1, $Y_{p,k}$ is a variable, $N_{ECCE,p,k}$ is a number of ECCEs included in the resource block set p of a subframe k, $M_p^{(L)}$ is a number of EPDCCH candidates at the specific aggregation level, and b indicates the offset determined based on a carrier index.

11. A method transmitting an Enhanced Physical Downlink Control Channel (EPDCCH) by a base station to a user equipment (UE) in a wireless communication system, the method comprising:
 transmitting a first EPDCCH for a first carrier to the UE, wherein the first EPDCCH mapped to one of first EPDCCH candidates for the first carrier in a specific physical resource block (PRB) pair set; and
 transmitting a second EPDCCH for a second carrier set to the UE, wherein the second EPDCCH mapped to one of second EPDCCH candidates for the second carrier in the specific resource block,
 wherein an interval between each of the first EPDCCH candidates at a specific aggregation level is determined based on a first value obtained by dividing a number of Enhanced Control Channel Elements (ECCEs) included in a resource block set of a subframe by a number of the second EPDCCH candidates at the specific aggregation level, and
 wherein a position of the second EPDCCH candidates is determined based on a second value obtained by adding the interval and an offset.

12. A base station in a wireless communication system, the base station comprising:
 a radio frequency (RF) module; and
 a processor connected to the RF module and configured to:
 transmit, via the RF module, a first Enhanced Physical Downlink Control Channel (EPDCCH) for a first carrier to a user equipment (UE), wherein the first EPDCCH mapped to one of first EPDCCH candidates for the first carrier in a specific physical resource block (PRB) pair set; and
 transmit, via the RF module, a second EPDCCH for a second carrier to the UE, wherein the second EPDCCH mapped to one of second EPDCCH candidates for the second carrier in the specific PRB pair set,
 wherein an interval between each of the first EPDCCH candidates at a specific aggregation level is determined based on a first value obtained by dividing a number of Enhanced Control Channel Elements (ECCEs) included in a resource block set of a subframe by a number of the second EPDCCH candidates at the specific aggregation level, and
 wherein a position of the second EPDCCH candidates is determined based on a second value obtained by adding the interval and an offset.

* * * * *